US012804715B2

(12) United States Patent
Kalamkar et al.

(10) Patent No.: US 12,804,715 B2
(45) Date of Patent: Nov. 17, 2026

(54) MEDIUM PROTECTION FOR SHARED ACCESS POINTS IN COORDINATED TIME DIVISION MULTIPLE ACCESS

(71) Applicant: QUALCOMM Incorporated, San Diego, CA (US)

(72) Inventors: Sanket Sanjay Kalamkar, San Diego, CA (US); Gaurang Naik, San Diego, CA (US); Abhishek Pramod Patil, San Diego, CA (US); Alfred Asterjadhi, San Diego, CA (US); George Cherian, San Diego, CA (US); Giovanni Chisci, San Diego, CA (US); Sherief Helwa, San Diego, CA (US); Sai Yiu Duncan Ho, San Diego, CA (US); Naveen Kumar Kakani, Flower Mound, TX (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/587,746

(22) Filed: Feb. 26, 2024

(65) Prior Publication Data

US 2025/0274976 A1 Aug. 28, 2025

(51) Int. Cl.

| | |
|---|---|
| ***H04W 74/0816*** | (2024.01) |
| ***H04W 74/08*** | (2024.01) |
| ***H04W 76/28*** | (2018.01) |

(52) U.S. Cl.

CPC ... *H04W 74/0816* (2013.01); *H04W 74/0866* (2013.01); *H04W 76/28* (2018.02)

(58) Field of Classification Search

CPC ......... H04W 74/0816; H04W 74/0866; H04W 76/28; H04W 74/002; H04W 74/06; H04W 72/04; H04W 72/27; H04W 84/12

See application file for complete search history.

(56) References Cited

U.S. PATENT DOCUMENTS

| | | | | |
|---|---|---|---|---|
| 10,154,482 | B2 * | 12/2018 | Kim | H04L 1/00 |
| 2017/0048047 | A1 * | 2/2017 | Kadous | H04L 1/1635 |

(Continued)

OTHER PUBLICATIONS

International Search Report and Written Opinion—PCT/US2025/014127—ISA/EPO—May 19, 2025.

(Continued)

*Primary Examiner* — Mohamed A Kamara
(74) *Attorney, Agent, or Firm* — Holland & Hart LLP

(57) ABSTRACT

This disclosure provides methods, components, devices and systems for medium protection for shared access points in coordinated time division multiple access. Some aspects more specifically relate to enhancing the likelihood that a shared access point (AP) is able to receive a message from a sharing AP that shares a portion of a transmit opportunity (TXOP) that has been obtained by the sharing AP. In some examples, shared AP may perform medium management to reduce the likelihood that one or more other wireless communication devices will occupy the wireless medium at an expected transmission time of the message from the sharing AP. Medium management performed by the shared AP may include, for example, one or more of implementing short TXOP durations, enabling ready-to-send (RTS) and clear-to-send (CTS) exchanges, scheduling of uplink access for associated wireless communication devices, or terminating one or more intra basic service set (BSS) transmissions.

19 Claims, 12 Drawing Sheets

(56) References Cited

U.S. PATENT DOCUMENTS

| | | | | |
|---|---|---|---|---|
| 2020/0236597 | A1* | 7/2020 | Su | H04W 36/0077 |
| 2021/0410149 | A1* | 12/2021 | Xia | H04L 1/1887 |
| 2023/0292363 | A1* | 9/2023 | Sundman | H04W 74/0816 |

OTHER PUBLICATIONS

Kim G (LG Electronics)., et al., "Coordinated TDM A (Follow up)", 11-23-1910-00-00BN—Coordinated—TDMA—Follow-Up, IEEE—SA Mentor, Piscataway, NJ USA, vol. 802.11 UHR, 802.11bn, Nov. 13, 2023, XP068207062, pp. 1-9, p. 5.

Patil A (Qualcomm)., et al., "Coordinated TDMA (C-TDMA) Follow-up", 11-23-1895-02-00BN-C—TDMA—FRAME—SEQUENCE, IEEE—SA Mentor, Piscataway, NJ USA, vol. 802.11 UHR, 802.11bn, No. 2, Jan. 15, 2024, pp. 1-13, XP068275108, pp. 3-7.

* cited by examiner

1200

MEDIUM PROTECTION FOR SHARED ACCESS POINTS IN COORDINATED TIME DIVISION MULTIPLE ACCESS

TECHNICAL FIELD

This disclosure relates generally to wireless communication and, more specifically, to medium protection for shared access points in coordinated time division multiple access.

DESCRIPTION OF THE RELATED TECHNOLOGY

Wireless communication networks are widely deployed to provide various types of communication content such as voice, video, packet data, messaging, broadcast, and so on. Some wireless communication networks may be capable of supporting communication with multiple users by sharing the available system resources (such as time, frequency, or power). Further, a wireless communication network may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM), among other examples. Wireless communication devices may communicate in accordance with any one or more of such wireless communication technologies, and may include wireless stations (STAs), wireless access points (APs), user equipment (UEs), network entities, or other wireless nodes.

In some wireless local area networks (WLANs), wireless communication devices may support contention-based access and communication. In such contention-based networks, a wireless device, such as an AP, may contend for access to a wireless medium, or may reserve channel access for a duration of time known as a transmit opportunity (TXOP). In some situations, an AP that gains access to the wireless medium (also referred to as a "sharing AP") may not intend to use all of the TXOP, and the sharing AP may share part of the TXOP with at least one other AP (also referred to as a "shared AP") for example using an allocation frame that allocates a portion of the TXOP to the shared AP. Such techniques may allow the shared AP to have channel access without performing a channel contention procedure and may reduce latency for shared APs and reduce the likelihood of collisions in channel contention procedures. However, these other different schemes permitting sharing of the TXOP may result in inefficiencies in examples in which the shared AP is unable to receive the allocation frame from the sharing AP that allocates the portion of the TXOP to the shared AP.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication performed by a first wireless communication device. The method may include receiving a first message, from a second wireless communication device, that indicates the second wireless communication device has obtained access to a wireless medium for a duration of a transmit opportunity (TXOP), transmitting, in association with receiving the first message, one or more medium management messages configured to inhibit one or more other wireless communication devices associated with the first wireless communication device from transmitting during a second duration associated with a second message, and receiving the second message from the second wireless communication device during the second duration, the second message indicating a set of one or more communication parameters for the first wireless communication device to share a portion of the TXOP for communication with the one or more other wireless communication devices.

Another innovative aspect of the subject matter described in this disclosure can be implemented in a first wireless communication device for wireless communication. The first wireless communication device may include a processing system that includes processor circuitry and memory circuitry that stores code. The processing system may be configured to cause the first wireless communication device to receive a first message, from a second wireless communication device, that indicates the second wireless communication device has obtained access to a wireless medium for a duration of a TXOP, transmit, in association with receiving the first message, one or more medium management messages configured to inhibit one or more other wireless communication devices associated with the first wireless communication device from transmitting during a second duration associated with a second message, and receive the second message from the second wireless communication device during the second duration, the second message indicating a set of one or more communication parameters for the first wireless communication device to share a portion of the TXOP for communication with the one or more other wireless communication devices.

Another innovative aspect of the subject matter described in this disclosure can be implemented in a first wireless communication device for wireless communication. The first wireless communication device may include means for receiving a first message, from a second wireless communication device, that indicates the second wireless communication device has obtained access to a wireless medium for a duration of a TXOP, means for transmitting, in association with receiving the first message, one or more medium management messages configured to inhibit one or more other wireless communication devices associated with the first wireless communication device from transmitting during a second duration associated with a second message, and means for receiving the second message from the second wireless communication device during the second duration, the second message indicating a set of one or more communication parameters for the first wireless communication device to share a portion of the TXOP for communication with the one or more other wireless communication devices.

Another innovative aspect of the subject matter described in this disclosure can be implemented in a non-transitory computer-readable medium storing code for wireless communication. The code may include instructions executable by one or more processors to receive a first message, from a second wireless communication device, that indicates the second wireless communication device has obtained access to a wireless medium for a duration of a TXOP, transmit, in association with receiving the first message, one or more medium management messages configured to inhibit one or more other wireless communication devices associated with the first wireless communication device from transmitting during a second duration associated with a second message, and receive the second message from the second wireless communication device during the second duration, the second message indicating a set of one or more communication parameters for the first wireless communication device to share a portion of the TXOP for communication with the one or more other wireless communication devices.

In some examples of the method, first wireless communication devices, and non-transitory computer-readable medium described herein, a first medium management message that includes a channel occupancy indication that corresponds to a duration of the first medium management message, where the channel occupancy indication may be configured to cause the one or more other wireless communication devices to refrain from transmitting to the first wireless communication device for the duration of the first medium management message.

Some examples of the method, first wireless communication devices, and non-transitory computer-readable medium described herein may further include operations, features, means, or instructions for receiving an uplink transmission from a third wireless communication device of the one or more other wireless communication devices subsequent to the duration of the first medium management message indicated by the channel occupancy indication and prior to receiving the second message.

In some examples of the method, first wireless communication devices, and non-transitory computer-readable medium described herein, a first medium management message that includes a transmission opportunity duration limit for the one or more other wireless communication devices, the transmission opportunity duration limit corresponding to a third duration that is less than the second duration associated with the second message. Some examples of the method, first wireless communication devices, and non-transitory computer-readable medium described herein may further include operations, features, means, or instructions for ignoring an uplink transmission from the one or more other wireless communication devices subsequent to the third duration and within a time offset that precedes an expected transmission time of the second message.

In some examples of the method, first wireless communication devices, and non-transitory computer-readable medium described herein, a first medium management message that includes an indication to the one or more other wireless communication devices to perform a ready-to-send (RTS) and clear-to-send (CTS) exchange prior to uplink data transmissions from the one or more other wireless communication devices to the first wireless communication device.

Some examples of the method, first wireless communication devices, and non-transitory computer-readable medium described herein may further include operations, features, means, or instructions for receiving a request to send (RTS) message from a third wireless communication device in accordance with the RTS and clear to send (CTS) exchange and transmitting a CTS message to the third wireless communication device in accordance with the RTS and CTS exchange when communication associated with the RTS message are expected to be completed prior to an expected transmission time of the second message.

In some examples of the method, first wireless communication devices, and non-transitory computer-readable medium described herein, the one or more medium management messages may include operations, features, means, or instructions for a first medium management message that includes a multi-user enhanced distributed channel access (MU EDCA) timer for the one or more other wireless communication devices that indicates a third duration that corresponds to an expected transmission time of the second message, where the MU EDCA timer may be configured to inhibit single-user uplink communication to the first wireless communication device for the third duration of the MU EDCA timer.

In some examples of the method, first wireless communication devices, and non-transitory computer-readable medium described herein, the one or more medium management messages may include operations, features, means, or instructions for a first medium management message that includes an indication to the one or more other wireless communication devices that uplink communication with the first wireless communication device is to be discontinued at a time offset in advance of an expected transmission time of the second message.

In some examples of the method, first wireless communication devices, and non-transitory computer-readable medium described herein, a first medium management message that includes a channel occupancy indication that corresponds to a third duration between the first medium management message and an expected transmission time of the second message. In some examples of the method, first wireless communication devices, and non-transitory computer-readable medium described herein, the first message includes an indication that the wireless medium will be occupied by the second wireless communication device through an expected transmission time of the second message.

In some examples of the method, first wireless communication devices, and non-transitory computer-readable medium described herein, the first message includes an expected transmission time of the second message and a timeout value that indicates the first wireless communication device is to discontinue inhibition of the one or more other wireless communication devices associated with the first wireless communication device from transmitting during the second duration associated with the second message from the second wireless communication device if the second message is not received at the first wireless communication device before an end of a third duration indicated by the timeout value. In some examples of the method, first wireless communication devices, and non-transitory computer-readable medium described herein, the first message further includes a total duration of the TXOP, that indicates the first wireless communication device is to discontinue inhibition of the one or more other wireless communication devices associated with the first wireless communication device from transmitting subsequent to the total duration of the TXOP.

Some examples of the method, first wireless communication devices, and non-transitory computer-readable medium described herein may further include operations, features, means, or instructions for receiving, prior to receiving the first message, an indication of whether the one or more other wireless communication devices associated with the first wireless communication device are to be inhibited from transmitting during any portion of the duration of a TXOP.

Another innovative aspect of the subject matter described in this disclosure can be implemented in a method for wireless communications by a first wireless communication device. The method may include obtaining access to a wireless medium for communication with one or more other wireless communication devices during a TXOP, the TXOP corresponding to a duration during which the first wireless communication device has the access to the wireless medium, transmitting a first message that indicates an occupancy time interval within the TXOP during which the wireless medium is reserved for communication of the first wireless communication device, and transmitting a second message to a second wireless communication device indicating communication parameters for the second wireless communication device to share a portion of the TXOP that is outside of the occupancy time interval for communication with the one or more other wireless communication devices associated with the second wireless communication device.

Another innovative aspect of the subject matter described in this disclosure can be implemented in a first wireless communication device for wireless communications. The first wireless communication device may include a processing system that includes processor circuitry and memory circuitry that stores code. The processing system may be configured to cause the first wireless communication device to obtain access to a wireless medium for communication with one or more other wireless communication devices during a TXOP, the TXOP corresponding to a duration during which the first wireless communication device has the access to the wireless medium, transmit a first message that indicates an occupancy time interval within the TXOP during which the wireless medium is reserved for communication of the first wireless communication device, and transmit a second message to a second wireless communication device indicating communication parameters for the second wireless communication device to share a portion of the TXOP that is outside of the occupancy time interval for communication with the one or more other wireless communication devices associated with the second wireless communication device.

Another innovative aspect of the subject matter described in this disclosure can be implemented in a non-transitory computer-readable medium storing code for wireless communication. The first wireless communication device may include means for obtaining access to a wireless medium for communication with one or more other wireless communication devices during a TXOP, the TXOP corresponding to a duration during which the first wireless communication device has the access to the wireless medium, means for transmitting a first message that indicates an occupancy time interval within the TXOP during which the wireless medium is reserved for communication of the first wireless communication device, and means for transmitting a second message to a second wireless communication device indicating communication parameters for the second wireless communication device to share a portion of the TXOP that is outside of the occupancy time interval for communication with the one or more other wireless communication devices associated with the second wireless communication device.

A non-transitory computer-readable medium storing code for wireless communication performed is described. The code may include instructions executable by one or more processors to obtain access to a wireless medium for communication with one or more other wireless communication devices during a TXOP, the TXOP corresponding to a duration during which the first wireless communication device has the access to the wireless medium, transmit a first message that indicates an occupancy time interval within the TXOP during which the wireless medium is reserved for communication of the first wireless communication device, and transmit a second message to a second wireless communication device indicating communication parameters for the second wireless communication device to share a portion of the TXOP that is outside of the occupancy time interval for communication with the one or more other wireless communication devices associated with the second wireless communication device.

In some examples of the method, first wireless communication devices, and non-transitory computer-readable medium described herein, the occupancy time interval corresponds to a duration of the first message. Some examples of the method, first wireless communication devices, and non-transitory computer-readable medium described herein may further include operations, features, means, or instructions for transmitting a third message subsequent to the first message and prior to the second message, the third message indicating an extended occupancy time interval within the TXOP during which the wireless medium is reserved for communication of the first wireless communication device. In some examples of the method, first wireless communication devices, and non-transitory computer-readable medium described herein, the occupancy time interval within the TXOP may be extended on a per physical layer convergence protocol service data unit (PSDU) basis for one or more PSDU communication of the first wireless communication device prior to transmission of the second message.

In some examples of the method, first wireless communication devices, and non-transitory computer-readable medium described herein, the occupancy time interval that corresponds to the duration of the first message allows for spatial reuse of the wireless medium by the second wireless communication device for communication with a third wireless communication device associated with the second wireless communication device, and where the third wireless communication device is outside of a communication range of the first wireless communication device.

In some examples of the method, first wireless communication devices, and non-transitory computer-readable medium described herein, the occupancy time interval indicates that the wireless medium will be occupied by the first wireless communication device through an expected transmission time of the second message.

In some examples of the method, first wireless communication devices, and non-transitory computer-readable medium described herein, the first message includes an expected transmission time of the second message and a timeout value that indicates the second wireless communication device is to discontinue sharing procedures associated with the TXOP if the second message is not received at the second wireless communication device before an end of a third duration indicated by the timeout value. In some examples of the method, first wireless communication devices, and non-transitory computer-readable medium described herein, the first message further includes a total duration of the TXOP, that indicates the second wireless communication device is to discontinue sharing procedures associated with the TXOP subsequent to the total duration of the TXOP.

Some examples of the method, first wireless communication devices, and non-transitory computer-readable medium described herein may further include operations, features, means, or instructions for transmitting, prior to transmitting the first message, an indication of whether the occupancy time interval within the TXOP will span all or a portion of a second duration between the first message and the second message.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
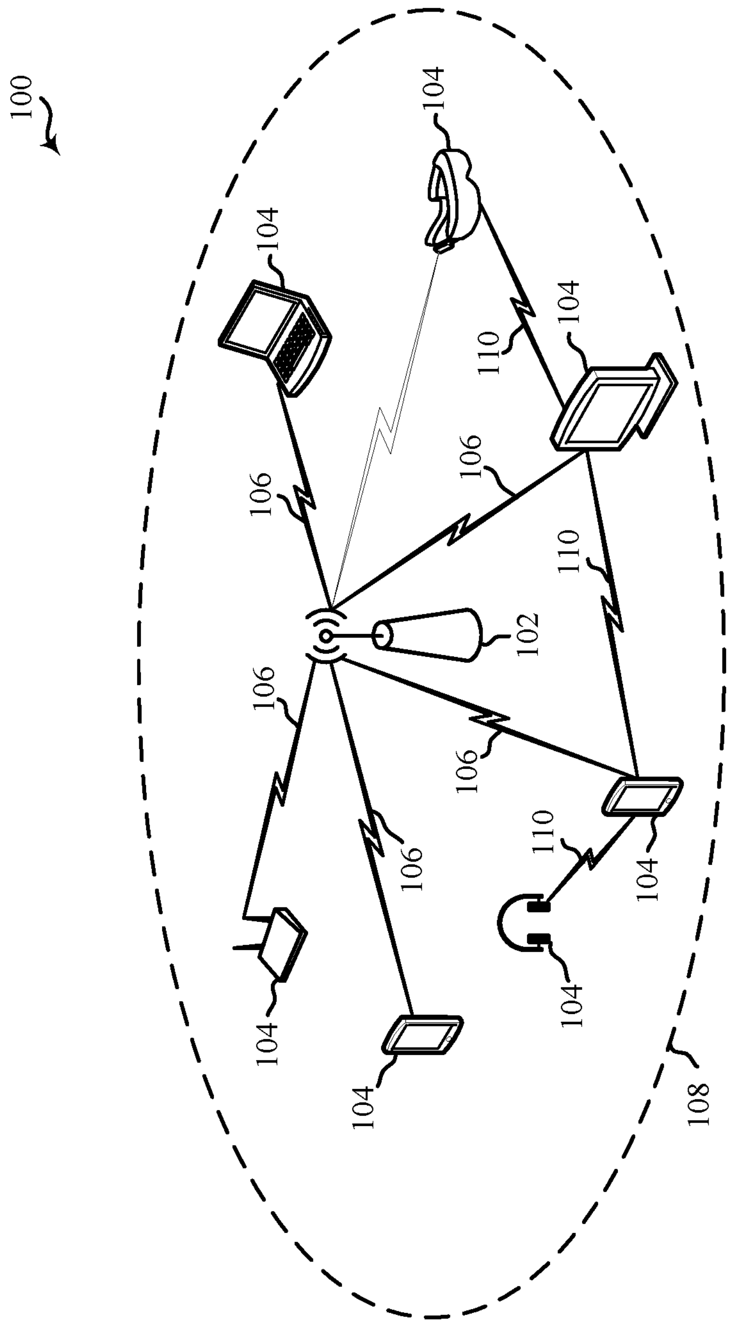
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IoT) network.

Various aspects relate generally to medium protection for shared access points (APs) in coordinated time division multiple access (C-TDMA). Some aspects more specifically relate to enhancing the likelihood that a shared AP is able to receive a message (for example, a message including an allocation frame) from a sharing AP that indicates that the shared AP can use a portion of a transmit opportunity (TXOP) that has been obtained by the sharing AP. In some examples, the sharing AP may transmit a first message, such as a message including a schedule announcement frame, that indicates one or more parameters associated with the a TXOP obtained by the sharing AP, and that indicates a relatively short duration channel occupancy (such as indicated by a network allocation vector (NAV)). Based on the first message, the shared AP may perform medium management to reduce the likelihood that one or more other wireless communication devices (such as one or more stations (STAs) or other APs) in a vicinity of the shared AP will occupy the wireless medium at an expected transmission time of a second message that provides the shared AP a resource allocation from the TXOP. The medium management performed by the shared AP may include, for example, one or more of implementing short TXOP durations for associated STAs during the TXOP; enabling request-to-send (RTS) and clear-to-send (CTS) exchanges for associated STAs during the TXOP; scheduling uplink access via multi-user (MU) enhanced distributed channel access (EDCA) procedures during the TXOP; and/or terminating one or more intra basic service set (BSS) transmissions during the TXOP.

Alternatively, in some other aspects, the first message transmitted by the sharing AP may indicate a relatively long duration channel occupancy associated with an expected transmission time of the second message, and the shared AP may transmit a control response frame CTS associated with the first message that also indicates the relatively long duration channel occupancy. In some aspects, the sharing AP may also provide signaling to indicate a TXOP timeout value, and the shared AP may stop, pause, or avoid medium management in examples in which the second message is not received within a time duration associated with the TXOP timeout value.

Particular aspects of the subject matter described in this disclosure can be implemented to realize one or more of the following potential advantages. In some examples, by performing medium management at a shared AP according to a short duration channel occupancy indication, the described techniques may provide for spatial reuse at the shared AP during the TXOP, while reducing a likelihood that the wireless medium will be occupied at an expected transmission time of the second message. For example, implementing short TXOP durations at the shared AP may allow relatively short communication with one or more STAs associated with the shared AP during the TXOP that are completed prior to an expected transmission time of the second message. Similarly, enabling RTS/CTS exchanges with STAs associated with the shared AP, scheduling uplink access via MU-EDCA, and/or terminating one or more intra-BSS transmissions, during the TXOP may allow communication with one or more STAs associated with the shared AP during the TXOP to be completed prior to an expected transmission time of the second message. On the other hand, in some examples, by providing a relatively long duration channel occupancy indication in the first message from the sharing AP, a CTS from the sharing AP associated with the first message may indicate the long duration channel occupancy, and thus relatively low signaling overhead may be used to inhibit one or more associated STAs of the shared AP from attempting to access the wireless medium at an expected transmission time of the second message. In some examples, by providing the indication of a TXOP timeout value, the shared AP may discontinue medium management procedures associated with the TXOP in examples in which the shared AP does not receive the TXOP allocation frame within a time duration associated with the TXOP timeout value, which allows for resumption of regular contention procedures in examples in which one or more messages associated with the TXOP are not received from the sharing AP.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communication (hereinafter also referred to as "Wi-Fi communication" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHZ, 6 GHZ, 45 GHZ, and 60 GHz bands. Some examples of the APs 102 and STAs 104 described herein also may communicate in other frequency bands that may support licensed or unlicensed communication. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHZ), FR2 (24.25 GHZ-52.6 GHZ), FR3 (7.125 GHZ-24.25 GHZ), FR4a or FR4-1 (52.6 GHZ-71 GHZ), FR4 (52.6 GHz-114.25 GHZ), and FR5 (114.25 GHZ-300 GHZ).

Each of the frequency bands may include multiple subbands and frequency channels (also referred to as subchannels). The terms "channel" and "subchannel" may be used interchangeably herein, as each may refer to a portion of frequency spectrum within a frequency band (for example, a 20 MHZ, 40 MHz, 80 MHZ, or 160 MHZ portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHZ, 240 MHZ, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (for example, for detecting preambles of PPDUs). Any transmission by an AP 102 or a STA 104 within a BSS must involve transmission on the primary 20 MHz channel. As such, in some other systems, the transmitting device must contend on and win a TXOP on the primary channel to transmit anything at all. However, some APs 102 and STAs 104 supporting ultra-high reliability (UHR) communication or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (for example, UHR- or IEEE 802.11bn-compatible) devices for opportunistic access to spectrum that may be otherwise under-utilized.

Figure 2:
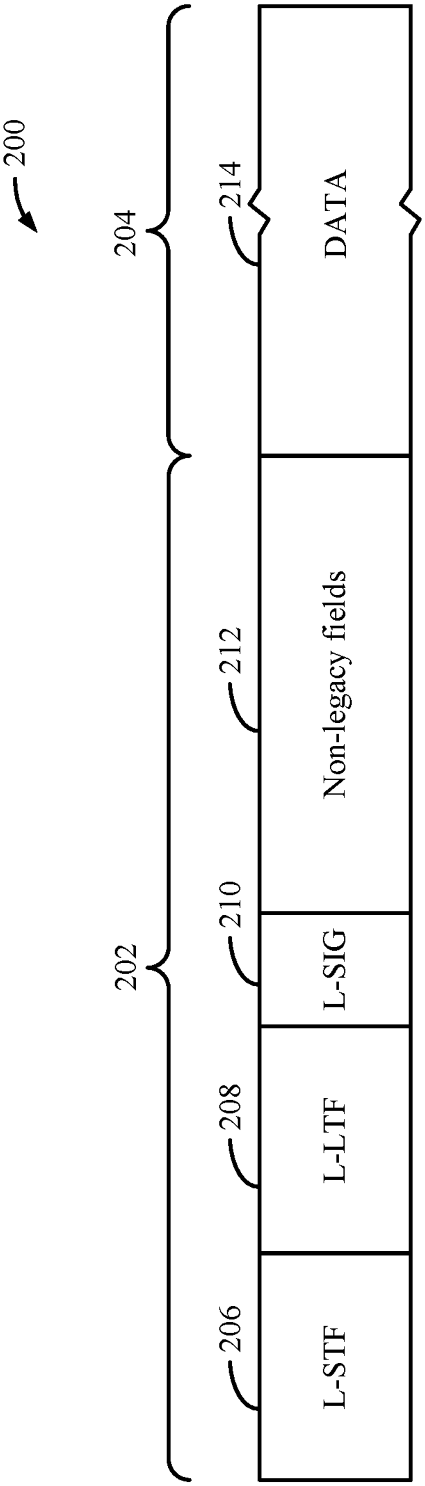
FIG. 2 shows an example protocol data unit (PDU) usable for communication between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
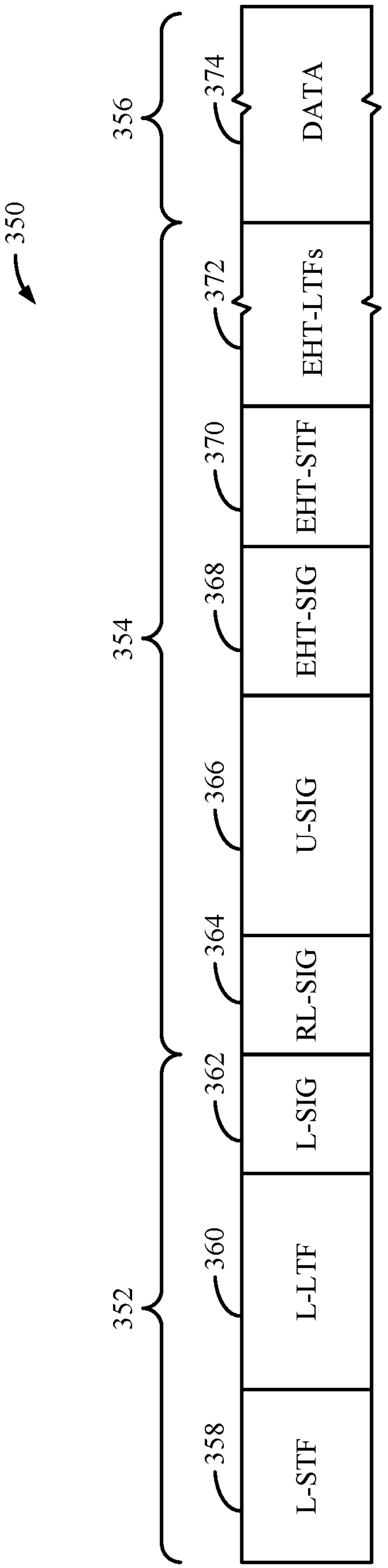
FIG. 3 shows an example physical layer (PHY) protocol data unit (PPDU) usable for communication between a wireless AP and one or more wireless STAs.

FIG. 3 shows an example physical layer (PHY) protocol data unit (PPDU) 350 usable for communication between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as an AP 102 or a STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
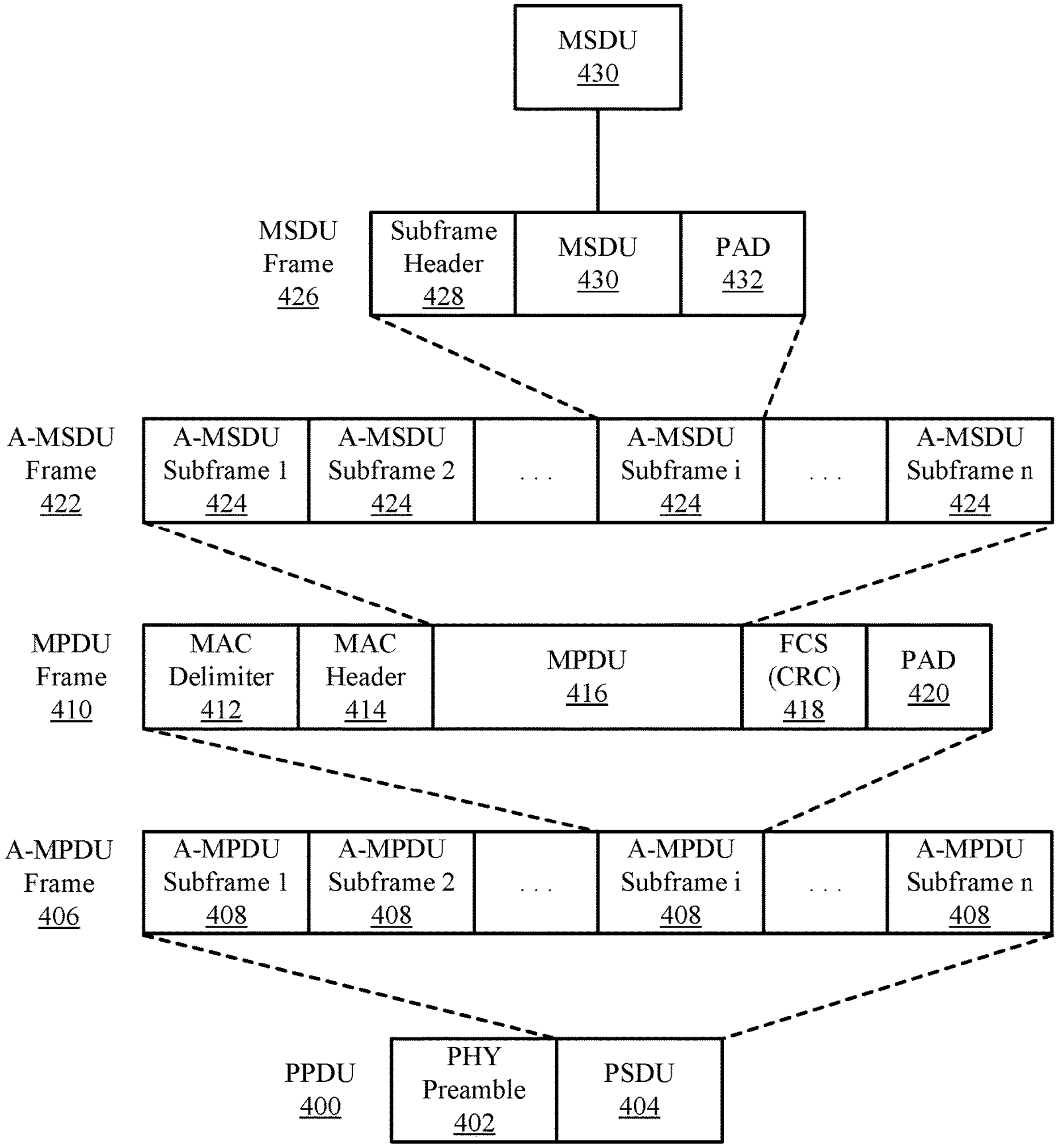
FIG. 4 shows a hierarchical format of an example PPDU usable for communication between a wireless AP and one or more wireless STAs.

FIG. 4 shows a hierarchical format of an example PPDU usable for communication between a wireless AP and one or more wireless STAs. For example, the AP and STAs may be examples of the AP 102 and the STAs 104 described with reference to FIG. 1. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 408 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field 418 may include a cyclic redundancy check (CRC)) and padding bits 420. The MPDU 416 may carry one or more MAC service data units (MSDUs) 430. For example, the MPDU 416 may carry an aggregated MSDU (A-MSDU) 422 including multiple A-MSDU subframes 424. Each A-MSDU subframe 424 may be associated with an MSDU frame 426 and may contain a corresponding MSDU 430 preceded by a subframe header 428 and, in some examples, followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body. The MAC header 414 includes a duration field indicating a duration extending from the end of the PPDU until at least the end of an acknowledgement (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 414 also includes one or more fields indicating addresses for the data encapsulated within the frame body. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (for example, by generating a message integrity check (MIC) for one or more relevant fields.

Some APs and STAs (for example, the AP 102 and the STAs 104 described with reference to FIG. 1) may implement spatial reuse techniques. For example, APs 102 and STAs 104 configured for communication using the protocols defined in the IEEE 802.11ax or 802.11be standard amendments may be configured with a BSS color. APs 102 associated with different BSSs may be associated with different BSS colors. A BSS color is a numerical identifier of an AP 102's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or the STA 104 may apply different contention parameters in accordance with whether the wireless packet is transmitted by, or transmitted to, another wireless communication device (such another AP 102 or STA 104) within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first RSSI detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

In some implementations, the AP 102 and STAs 104 can support various multi-user communication; that is, concurrent transmissions from one device to each of multiple devices (for example, multiple simultaneous downlink communication from an AP 102 to corresponding STAs 104), or concurrent transmissions from multiple devices to a single device (for example, multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple resource units (RUS) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Some APs and STAs (for example, the AP 102 and the STAs 104 described with reference to FIG. 1) may implement techniques for spatial reuse that involve participation in a coordinated communication scheme. According to such techniques, an AP 102 may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve C-TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communication with its associated STAs.

In some examples of such C-TDMA techniques, each portion of a plurality of portions of the TXOP includes a set of time resources that do not overlap with any time resources of any other portion of the plurality of portions of the TXOP. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to CSMA/CA or EDCA techniques. Additionally, by enabling a group of APs 102 associated with different BSSs to participate in a coordinated AP transmission session, during which the group of APs may share at least a portion of a single TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs 104 associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communication among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, a receive (RX) power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may be allocated resources during the TXOP as described above.

As discussed, C-TDMA may provide that a sharing AP that owns a TXOP may share a portion of the TXOP time with one or more shared APs. The scheme may improve latency and reduce contention/collisions. In some examples, to facilitate C-TDMA, a schedule announcement frame (which may be an example of a first message as discussed herein) and a TXOP allocation frame (which may be an example of a second message as discussed herein) may be used to signal information such as an expected duration of the overall TXOP, in examples in which the TXOP will be shared with a shared AP, a duration of the TXOP that is being shared, an estimated time at which the TXOP will be shared, traffic category or traffic flow for which the shared AP may use the TXOP, one or more STAs that may be served during a shared portion of the TXOP, or a combination thereof. However, in some situations the wireless medium at the shared AP may be in use in examples in which the TXOP allocation frame is transmitted, which may result in the shared AP not receiving the TXOP allocation frame. For example, a STA that is associated with the shared AP may be outside of a transmission range of the sharing AP, which may be referred to as a "hidden STA," may initiate a transmission with the shared AP that overlaps with a transmission time of the TXOP allocation frame. In another example, a neighboring OBSS STA in a vicinity of the shared AP may access the wireless medium and prevent the shared AP from receiving the TXOP allocation frame. In examples in which the shared AP does not receive the TXOP allocation frame, this may result in a wasted sharing opportunity, because none of the shared AP or one or more other APs are able to use the portion of the TXOP allocated by the sharing AP to the shared AP. Further, in such situations, the sharing AP may lose the TXOP in examples in which a STA associated with the shared AP or another other OBSS STA acquires the wireless medium during the shared portion of the TXOP that is unused by the shared AP.

Figure 5:
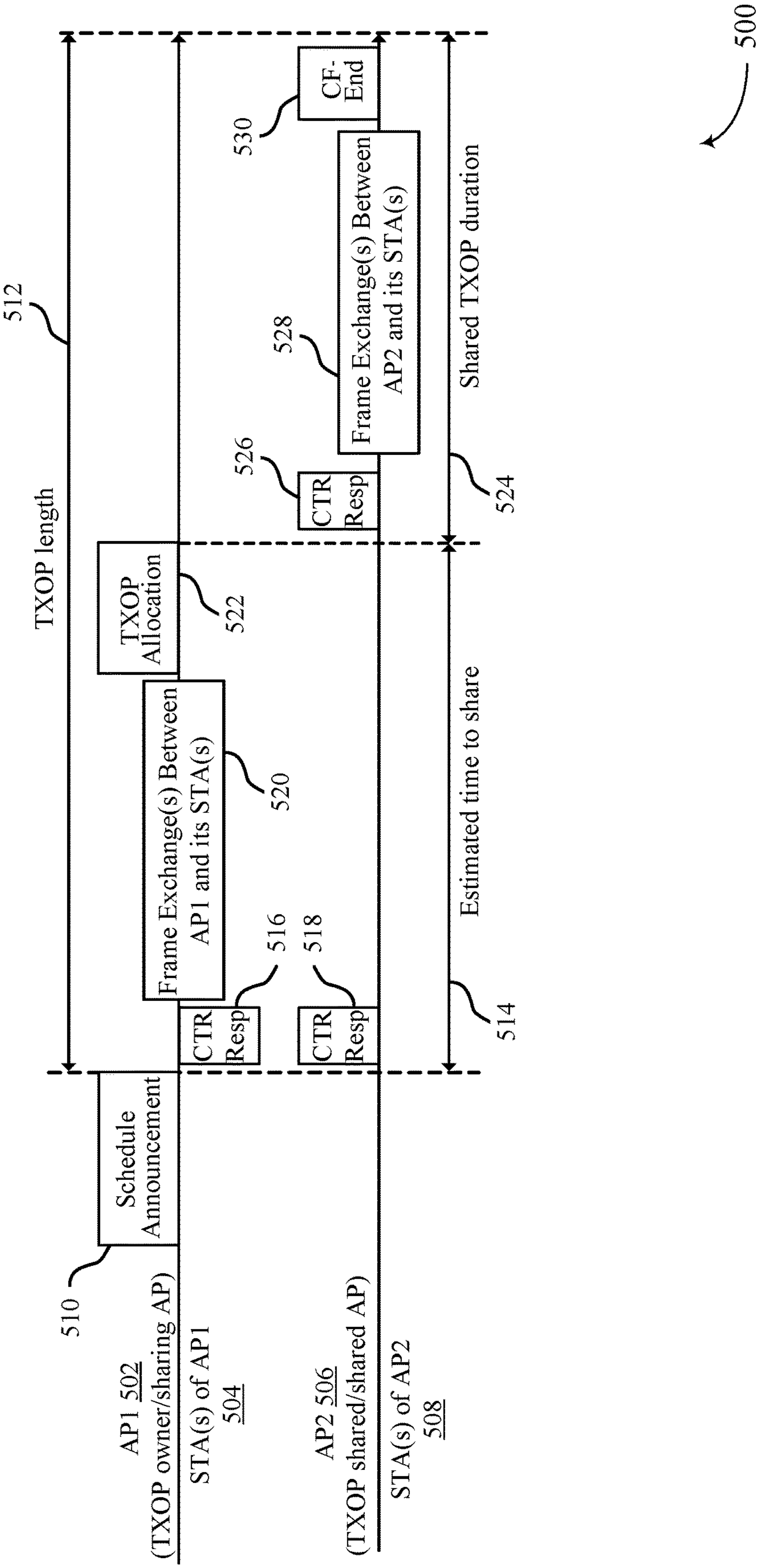
FIG. 5 shows an example of a timing diagram for coordinated time division multiple access (C-TDMA) that supports medium protection for shared APs.

FIG. 5 shows an example of a timing diagram for C-TDMA 500 that supports medium protection for shared access points. The timing diagram for C-TDMA 500 may implement or be implemented by aspects of the wireless communication network 100. For example, the timing diagram for C-TDMA 500 may illustrate signaling between an AP1 502 and one or more STAs 504 of AP1 502, and an AP2 506 and one or more STAs 508 of AP2 506, which may be examples of corresponding devices described herein.

In the example of FIG. 5, AP1 502, may gain access to a wireless medium for a TXOP and transmit a schedule announcement frame 510, which may be received at the STAs 504 of AP1 502, AP2 506, and in some examples one or more STAs 508 of AP2 506. As discussed herein, in some examples one or more STAs 508 of AP2 506 may be hidden STAs that do not receive the schedule announcement frame 510, or one more subsequent transmissions of AP1 502 associated with the schedule announcement frame 510. The STAs 504 of AP1 502 may transmit a control response 516 associated with the schedule announcement frame 510 that indicates the schedule announcement frame 510 has been received. In some examples, the schedule announcement frame 510 may be provided in a multi-user ready-to-send (MU-RTS) or MU-RTS TXOP sharing (TXS) trigger frame, and the control response 516 may be a CTS. Further, AP2 506 may transmit a control response 518 associated with the schedule announcement frame 510. Likewise, one or more other STAs and/or APs that receive the schedule announcement frame 510 may transmit associated control responses. In various examples, the schedule announcement frame 510 may indicate a TXOP length 512 associated with the TXOP, an estimated time to share 514 that may indicate an expected transmission time of a TXOP allocation frame 522, an identification of one or more other APs (such as AP2 506) that are expected to be allocated resources within the TXOP, one or more devices to be served during the TXOP, or any combination thereof. AP1 502 and the one or more STAs 504 of AP1 502 may perform frame exchanges 520 during a portion of the TXOP prior to transmission of the TXOP allocation frame 522.

In some examples, the schedule announcement frame 510, the TXOP allocation frame 522, or both, may include one or more of an identification of AP2 506, a time duration 524 of the shared portion of the TXOP that is allocated to AP2 506, a traffic priority for sharing, or an identification of one or more other STAs or APs to serve during the shared portion of the TXOP. AP2 506 may receive the TXOP allocation frame 522, may transmit control response 526, which in some examples may be a CTS, and proceed to perform frame exchange(s) 528 between AP2 506 and STAs 508 of AP2 506. Upon completion of frame exchange(s) 528, AP2 506 may transmit an end frame 530 (such as a CF-End frame) that returns any remaining portion of the TXOP to AP1 502. As discussed herein, in some examples the wireless medium at AP2 506 may be unprotected after an occupancy duration that is indicated in control response 518. For example, control response 518 may include a NAV that indicates channel occupancy for a time duration associated with the control response 518, such as a time duration associated with a short interframe space (SIFS) and a duration of the control response frame, and after a time period associated with the NAV a hidden STA may initiate a frame exchange that may overlap with the TXOP allocation frame 522. In various aspects discussed herein, medium protection procedures are described for the wireless medium at AP2 506 at an expected transmission time of the TXOP allocation frame 522. Various examples of such medium protection procedures are discussed with reference to FIGS. 6 through 12. Further, during the time duration 524 of the shared portion of the TXOP that is allocated to AP2 506 the wireless medium at AP1 502 may be unprotected after an occupancy duration that is indicated in the TXOP allocation frame 522, and medium protection procedures such as discussed herein may also be used at AP1 502 at an expected transmission time of the end frame 530.

Figure 6:
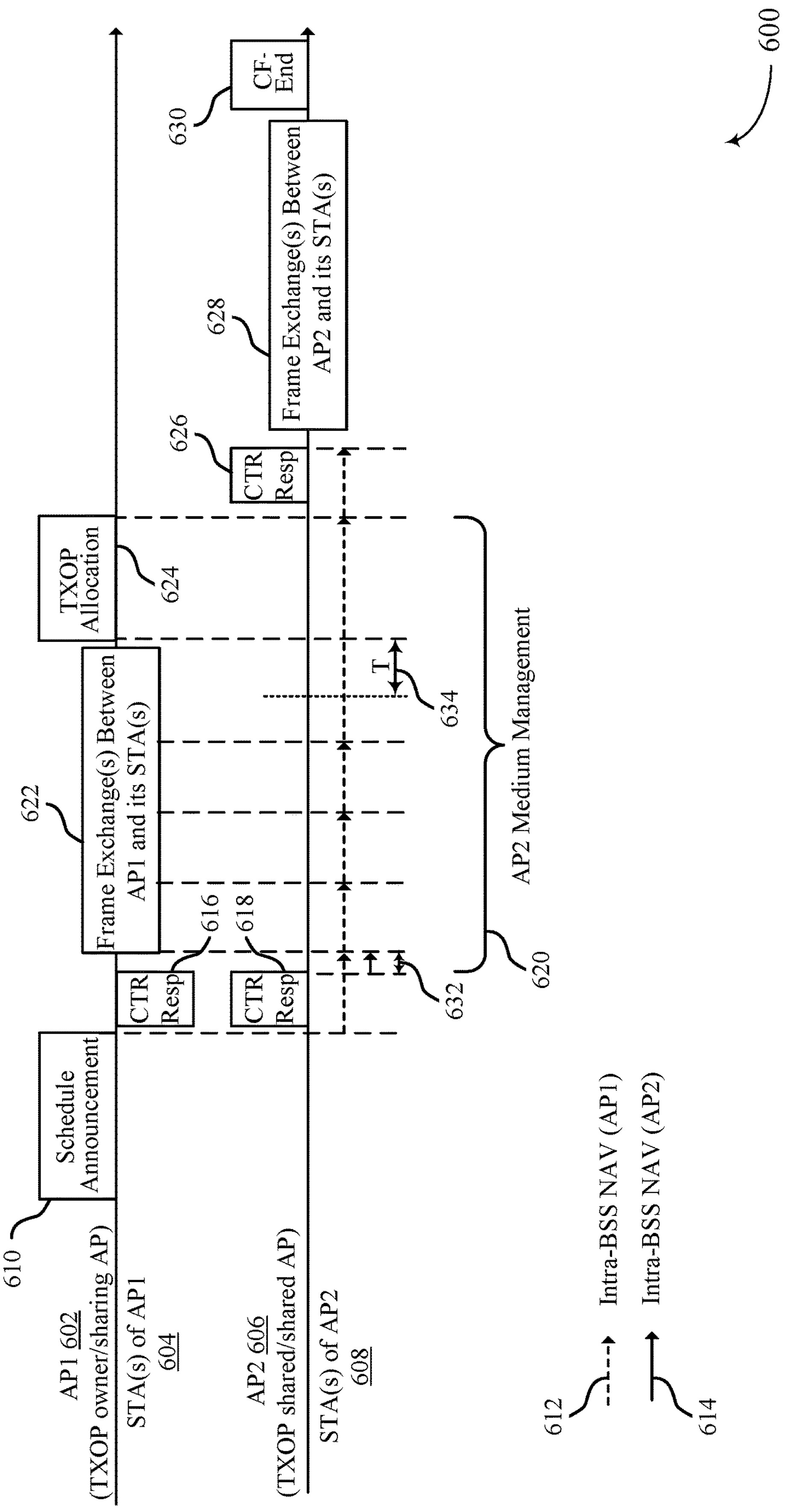
FIG. 6 shows an example of a timing diagram for C-TDMA with AP medium management that supports medium protection for shared APs.

FIG. 6 shows an example of a timing diagram for C-TDMA 600 with AP medium management that supports medium protection for shared APs. The timing diagram for C-TDMA 600 may implement or be implemented by aspects of the wireless communication network 100. For example, the timing diagram for C-TDMA 600 may illustrate signaling between an AP1 602 and one or more STAs 604 of AP1 602, and an AP2 606 and one or more STAs 608 of AP2 606, which may be examples of corresponding devices described herein.

In some examples, AP1 602, may gain access to a wireless medium for a TXOP and transmit a schedule announcement frame 610, which may be received at the STAs 604 of AP1 602, AP2 606, and in some examples one or more STAs 608 of AP2 606. The STAs 604 of AP1 602 may transmit a control response 616 associated with the schedule announcement frame 610. Further, AP2 606 may transmit a control response 618 associated with the schedule announcement frame 610. Likewise, one or more other STAs and/or APs that receive the schedule announcement frame 610 may transmit associated control responses. In various examples, the schedule announcement frame 610 may indicate parameters associated with the TXOP, as discussed above. AP1 602 and the one or more STAs 604 of AP1 602 may perform frame exchanges 622 during a portion of the TXOP prior to transmission of a TXOP allocation frame 624.

In this example, AP1 602 may setan intra-BSS NAV 612 with the schedule announcement frame 610. The intra-BSS NAV 612 may indicate, for example, a channel occupancy associated with AP1 602 transmissions that corresponds to sum of a duration of a first SIFS prior to control response 616, a duration of the control response 616, and a duration of a second SIFS subsequent to control response 616. Further, AP1 may extend the intra-BSS NAV 612 in one or more PSDUs that are transmitted as part of the frame exchange(s) 622, such that the intra-BSS NAV 612 is extended on a per-PSDU basis. In such examples, AP2 606 may set an intra-BSS NAV 614 to indicate a channel occupancy that corresponds to a duration of control response 618 and an associated SIFS, and the STAs 608 of AP2 606 that can receive transmissions from AP1 602 may set the basic NAV, and no NAV may be set for STAs 608 of AP2 606 and other OBSS STAs that are hidden to AP1 602. Thus, AP2 606 may be unprotected from uplink access from the STAs 608 of AP2 606 and other OBSS STAs that are hidden to AP1 602, and AP2 606 may be blocked and not be available to receive the TXOP allocation frame 624 from AP1 602. In order to reduce the likelihood of such situations, AP2 606 may perform one or more medium management procedures 620 during a portion of the shared TXOP subsequent to control response 618 until reception of the TXOP allocation frame 624. Subsequent to receiving the TXOP allocation frame 624, AP2 may transmit control response 626, may perform frame exchange(s) 628 between one or more associated STAs 608, and transmit end frame 630.

In some examples, due to the relatively short channel occupancy duration indicated by the short intra-BSS NAV 612, the wireless medium at AP2 606 may be blocked for a relatively short duration 632. Thus, one or more STAs 608 of AP2 606 that are hidden to AP1 602 and sufficiently far from the AP1 602 BSS may perform spatial reuse, which may enhance system throughput. Further, the one or more medium management procedures 620 may protect the wireless medium around AP2 606 such that the TXOP allocation frame 624 may be received at AP2 606.

In some examples, the one or more medium management procedures 620 may include setting of relatively short TXOP durations at AP2 606 for STAs 608 of AP2 606. In some examples, AP2 606 may ignore an uplink PPDU of a STA 608 in examples in which the PPDU is relatively close to an expected transmission of the TXOP allocation frame 624, such as within a time period (T) 634 prior to the expected transmission of the TXOP allocation frame 624. In such examples, having a relatively short TXOP duration may result in exchanges of correspondingly short PPDUs at AP2 606, which may reduce a loss of data for STAs 608 of AP2 606 for PPDUs that extend into time period 634.

In some examples, additionally, or alternatively, the one or more medium management procedures 620 may include scheduling uplink access for STAs 608 of AP2 606. For example, AP2 606 may deprioritize single user (SU) uplink for associated STAs 608 such as by setting an arbitration interframe space number (AIFSN) field, for all access classes, of an MU-EDCA parameter set element to 0, which may indicate that EDCA is disabled for the STAs 608 for the duration specified by an associated timer (such as, MUEDCATimer) for the corresponding access class. Thus, the one or more medium management procedures 620 may provide a condition to activate MU-EDCA in a C-TDMA framework.

As discussed above, in some examples AP2 606 may ignore an uplink PPDU of a STA 608 within a time period (T) 634. In some examples, of one or more STAs 608 of AP2 606 are hidden to AP1 602 may transmit one or more PPDUs concurrently with frame exchange(s) 622, and AP2 606 may receive such uplink transmissions only until a start of time period (T) 634 in advance of the TXOP allocation frame 624 transmission. This may provide that AP2 606 is ready to receive the TXOP allocation frame 624.

In some examples, additionally, or alternatively, the one or more medium management procedures 620 may include enabling RTS/CTS exchanges for STAs 608 of AP2 606, as discussed with reference to FIG. 7.

Figure 7:
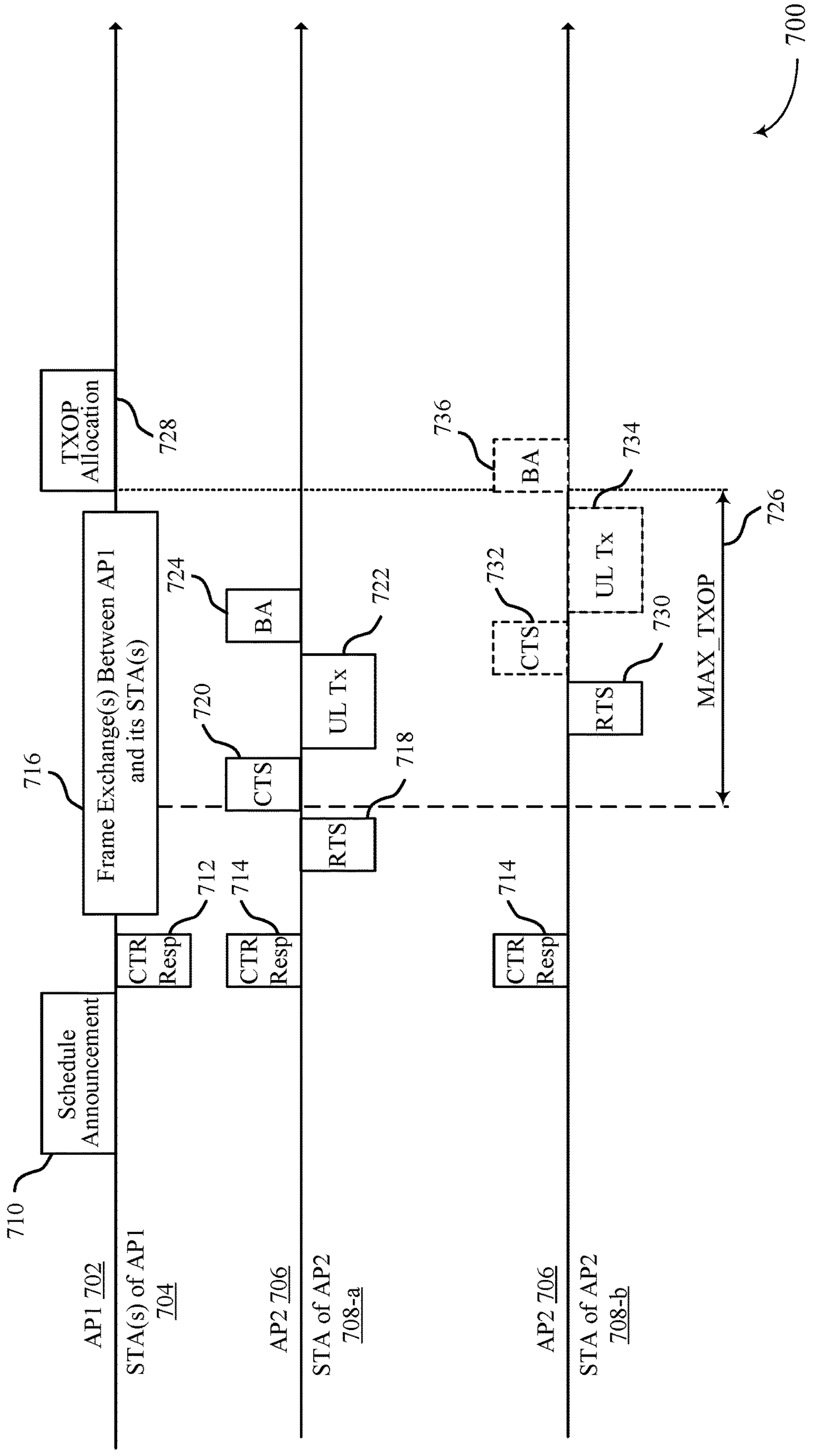
FIG. 7 shows an example of a timing diagram for C-TDMA with ready-to-send and clear-to-send exchanges that supports medium protection for shared APs.

FIG. 7 shows an example of a timing diagram for C-TDMA 700 with RTS and CTS exchanges that supports medium protection for shared access points. The timing diagram for C-TDMA 700 may implement or be implemented by aspects of the wireless communication network 100. For example, the timing diagram for C-TDMA 700 may illustrate signaling between an AP1 702 and one or more STAs 704 of AP1 702, and an AP2 706 and one or more STAs 708 of AP2 706, which may be examples of corresponding devices described herein.

In some examples, AP1 702 may gain access to a wireless medium for a TXOP and transmit a schedule announcement frame 710, which may be received at the STAs 704 of AP1 702, AP2 706, and in some examples one or more STAs 708 of AP2 706. The STAs 704 of AP1 702 may transmit a control response 712 associated with the schedule announcement frame 710. Further, AP2 706 may transmit a control response 714 associated with the schedule announcement frame 710. Likewise, one or more other STAs and/or APs that receive the schedule announcement frame 710 may transmit associated control responses. In various examples, the schedule announcement frame 710 may indicate parameters associated with the TXOP, as discussed above. AP1 702 and the one or more STAs 704 of AP1 702 may perform frame exchanges 716 during a portion of the TXOP prior to transmission of a TXOP allocation frame 728.

In some examples, AP2 706 may enable RTS/CTS exchanges for STAs 708 of AP2 706. AP2 706, as part of the RTS/CTS exchange, may provide a conditional CTS in examples in which the associated uplink transmission and related block acknowledgment (BA) can be completed in advance of an expected transmission time of the TXOP allocation frame 728. For example, a first STA 708-*a* of AP2 706 may transmit RTS 718. AP2 706 may transmit CTS 720 in examples in which it is determined that the associated frame exchange will be completed at or before a time period (8) 726 in advance of the expected transmission time of the TXOP allocation frame 728. Based on the CTS 720, the first STA 708-*a* may transmit uplink transmission 722, which may be acknowledged with BA 724. The wireless medium at AP2 706 may then be available for reception of the TXOP allocation frame 728.

In another example, a second STA 708-*b* of AP2 706 may transmit RTS 730. AP2 706 may not transmit an associated CTS 732 based on a determination that that the RTS 730 is not received prior to a start of a time period 726 in advance of the expected transmission time of the TXOP allocation frame 728. Thus, uplink transmission 734 and BA 736 will not be transmitted, and the wireless medium at AP2 706 may be available for reception of the TXOP allocation frame 728. In some examples, the time period 726 may be associated with a parameter MAX_TXOP that may be controlled by AP2 706 and may be set based on a TXOP that is allowed for STAs 708 to provide that the frame exchanges are complete in advance of the expected transmission time of the TXOP allocation frame 728 (such as may be indicated in the schedule announcement frame 710). In some examples, a value of MAX_TXOP may be greater than 0, and may be signaled by AP1 702, selected by AP2 706, or may be otherwise defined. In some examples, AP2 706 may set relatively short TXOPs for STAs 708 in order to enhance the likelihood that a CTS will be transmitted in response to a RTS, such as by setting a TXOP Duration RTS Threshold in a HE Operation element that is advertised by AP2 706. In some examples, AP2 706 may proactively advertise this in examples in which it supports C-TDMA or is part of an operator deployed network (such as enterprise) in which C-TDMA is performed between APs belonging to that operator.

Figure 8:
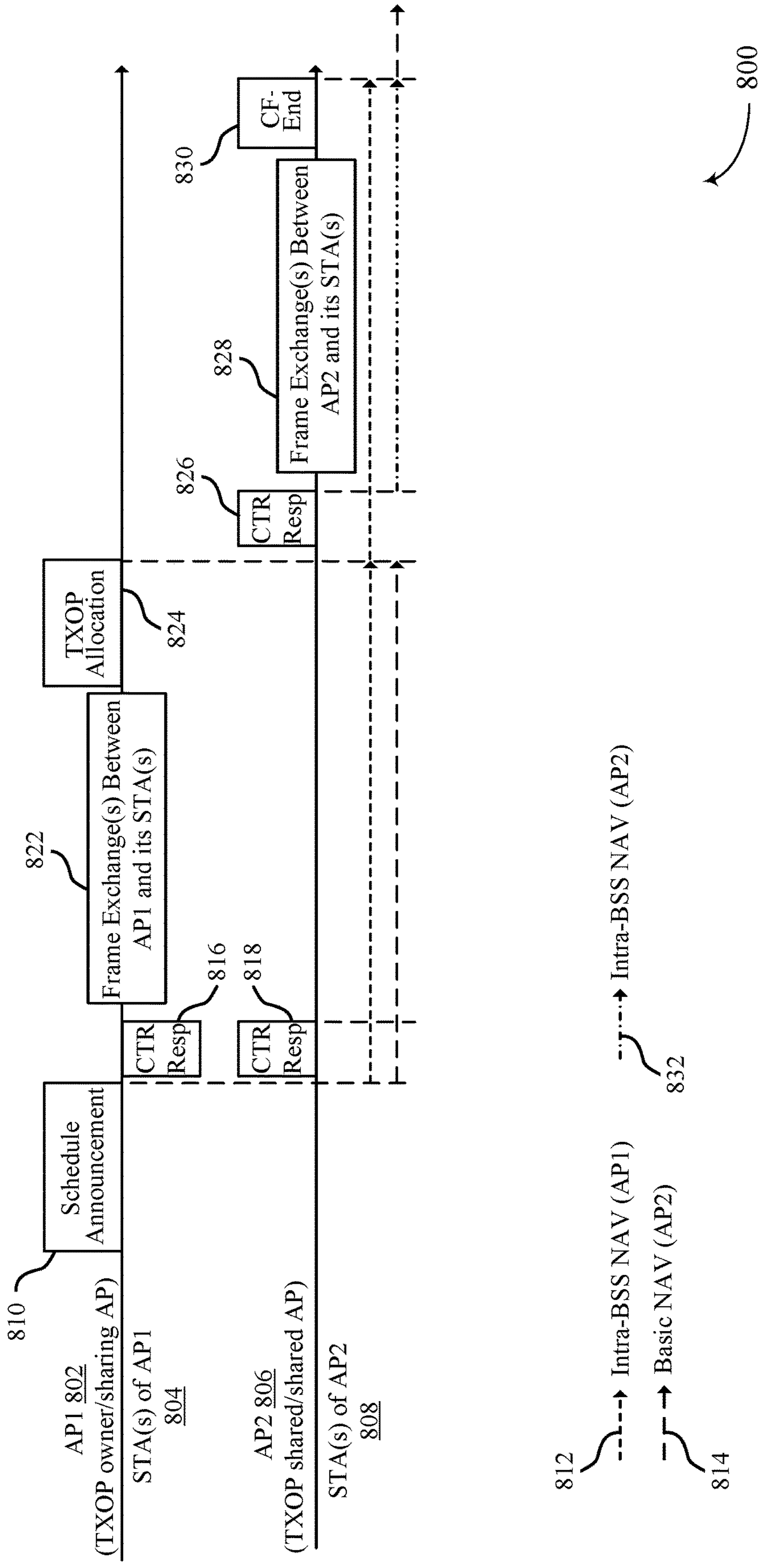
FIG. 8 shows an example of a timing diagram for C-TDMA with long network allocation vector indications that supports medium protection for shared APs.

FIG. 8 shows an example of a timing diagram for C-TDMA 800 with long network allocation vector indications that supports medium protection for shared access points in C-TDMA. The timing diagram for C-TDMA 800 may implement or be implemented by aspects of the wireless communication network 100. For example, the timing diagram for C-TDMA 800 may illustrate signaling between an AP1 802 and one or more STAs 804 of AP1 802, and an AP2 806 and one or more STAs 808 of AP2 806, which may be examples of corresponding devices described herein.

In some examples, AP1 802, may gain access to a wireless medium for a TXOP and transmit a schedule announcement frame 810, which may be received at the STAs 804 of AP1 802, AP2 806, and in some examples one or more STAs 808 of AP2 806. The STAs 804 of AP1 802 may transmit a control response 816 associated with the schedule announcement frame 810. Further, AP2 806 may transmit a control response 818 associated with the schedule announcement frame 810. Likewise, one or more other STAs and/or APs that receive the schedule announcement frame 810 may transmit associated control responses. In various examples, the schedule announcement frame 810 may indicate parameters associated with the TXOP, as discussed above. AP1 802 and the one or more STAs 804 of AP1 802 may perform frame exchanges 822 during a portion of the TXOP prior to transmission of a TXOP allocation frame 824. The TXOP allocation frame 824 may allocate a portion of the TXOP to AP2 806, and AP2 806 may transmit control response 826, perform frame exchange(s) 828 with one or more STAs 808 of AP2 806, and may transmit end frame 830.

In some examples, AP1 802 may setan intra-BSS NAV 812 with the schedule announcement frame 810 that indicates a channel occupancy duration that corresponds with a time period of the transmission of the TXOP allocation frame 824. Upon receiving the schedule announcement frame 810, the STAs 804 of AP1 802 may set their intra-BSS NAV, while STAs in other BSSs will set their basic NAV. In some examples, the control response 818 of AP2 806, and other control response responses, may provide a basic NAV 814 that corresponds to the duration indicated in the intra-BSS NAV 812. In some examples, such a long NAV approach may provide increased protection of the wireless medium at AP2 806 compared to the shorter NAV examples, such as by providing protection from OBSS transmissions. In some examples, the control response 826 of AP2 806 in response to the TXOP allocation frame 824 may include an intra-BSS NAV 832 that corresponds to a time duration until transmission of the end frame 830, which may act to inhibit STAs 804 of AP1 802 from transmitting prior to the end frame 830, and may help to protect the wireless medium at AP1 802.

Figure 9:
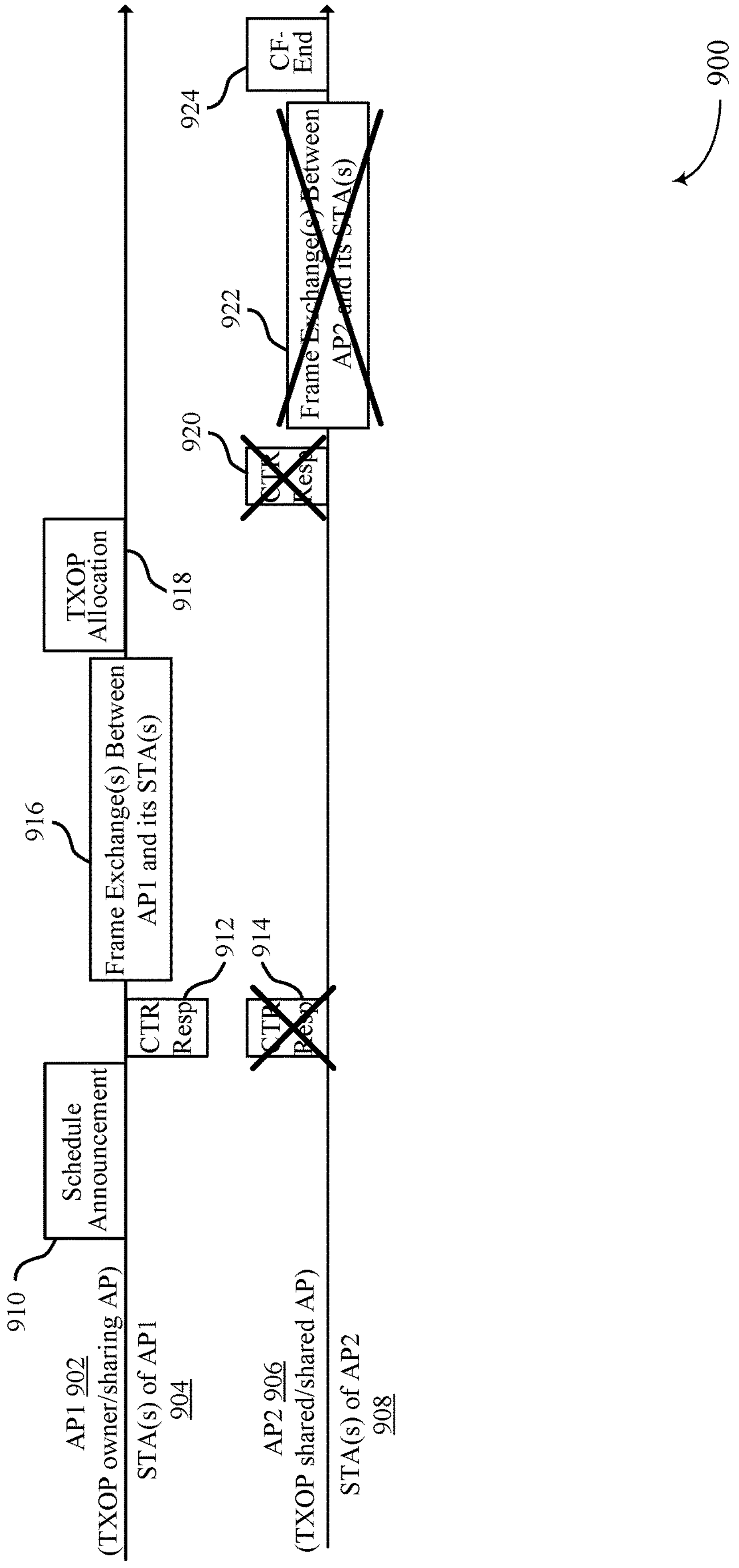
FIG. 9 shows an example of a timing diagram for C-TDMA with error handling that supports medium protection for shared APs.

FIG. 9 shows an example of a timing diagram for C-TDMA 900 with error handling that supports medium protection for shared access points in C-TDMA. The timing diagram for C-TDMA 900 may implement or be implemented by aspects of the wireless communication network 100. For example, the timing diagram for C-TDMA 900 may illustrate signaling between an AP1 902 and one or more STAs 904 of AP1 902, and an AP2 906 and one or more STAs 908 of AP2 906, which may be examples of corresponding devices described herein.

In some examples, AP1 902, may gain access to a wireless medium for a TXOP and transmit a schedule announcement frame 910, which may be received at the STAs 904 of AP1 902, AP2 906, and in some examples one or more STAs 908 of AP2 906. The STAs 904 of AP1 902 may transmit a control response 912 associated with the schedule announcement frame 910. In various examples, the schedule announcement frame 910 may indicate parameters associated with the TXOP, as discussed above. AP1 902 and the one or more STAs 904 of AP1 902 may perform frame exchanges 916 during a portion of the TXOP prior to transmission of a TXOP allocation frame 918.

In some examples, one or more transmissions may not be received at AP1 902 or AP2 906. For example, AP2 906 may not successfully receive the schedule allocation frame 910, and thus may not transmit control response 914. However, AP1 902 may still receive one or more control responses from one or more other devices and may still allocate a portion of the TXOP to the AP2 906 due to the control responses from different devices not being differentiable. In examples in which a long NAV is set; this may result in unnecessary blocking of STAs that have set the NAV.

Further, in some examples, AP2 906 may not receive the TXOP allocation frame 918, and thus may not transmit control response 920, perform frame exchanges 922, or transmit end frame 924. In some examples, error handling procedures may be provided to prevent loss of the TXOP in examples in which one or more transmissions are not received at AP2 906. In some examples, AP1 902 may provide a TXOP allocation timeout interval with the schedule announcement frame 910. In such examples, if AP2 906 does not receive the TXOP allocation frame 918 within a time duration indicated by the TXOP allocation timeout interval, which may correspond to a time at which the TXOP allocation frame 918 was supposed to be received as per the schedule announcement frame 910, AP2 906 may discontinue C-TDMA operation and medium protection procedures. For example, in examples in which X is a time at which the TXOP allocation frame 918 was supposed to be received and in examples in which T was the TXOP allocation timeout, AP2 906 may discontinue C-TDMA operation in examples in which the TXOP allocation frame 918 is not received until the time 'X+T.' Additionally, or alternatively, in some examples AP1 902 may provide an overall TXOP time, and in examples in which the TXOP of the AP1 902 ends at time Y, AP2 906 may discontinue C-TDMA operations in examples in which the TXOP allocation frame 918 is not received until the time determined based on the formula: min (Y, X+T). Such error handling may allow AP2 906 to resume non-C-TDMA operation for its associated STAs 908.

In some examples, a sharing AP, such as AP1 902, may provide an indication of a type of medium protection scheme that should be used at a shared AP, such as AP2 906. Such an indication may allow the shared AP to announce various parameters to associated STAs, such as in a beacon, even before participating in C-TDMA. In some examples, the sharing AP may provide an indication of what type of NAV, such as a short/incremental NAV or long NAV, will be used during C-TDMA. In some examples, such information sharing may be performed as part of negotiations before C-TDMA sharing begins.

Figure 10:
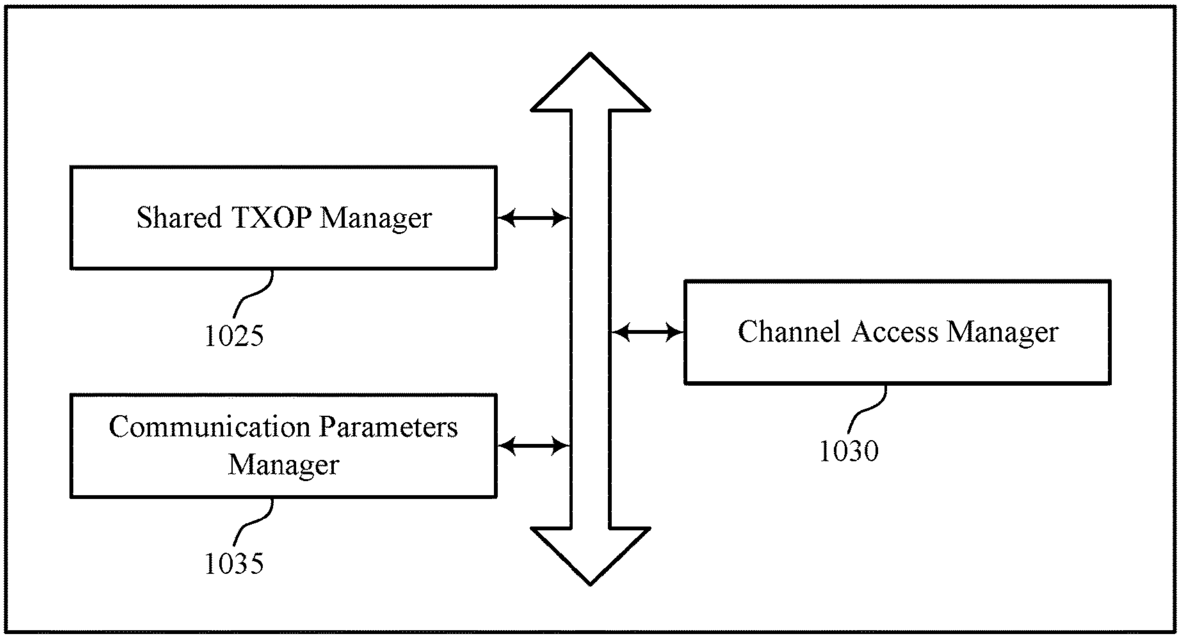
FIG. 10 shows a block diagram of an example wireless communication device that supports medium protection for shared APs in C-TDMA.

FIG. 10 shows a block diagram of an example wireless communication device that supports medium protection for shared access points in C-TDMA. In some examples, the wireless communication device is configured to perform the processes 1100 and 1200 described with reference to FIGS. 11 and 12, respectively. The wireless communication device may include one or more chips, SoCs, chipsets, packages, components or devices that individually or collectively constitute or include a processing system. The processing system may interface with other components of the wireless communication device, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device may transmit the information output from the chip. In such an example, the second interface may refer to an interface between the processing system of the chip and a reception component, such that the wireless communication device may receive information that is then passed to the processing system. In some such examples, the first interface also may obtain information, such as from the transmission component, and the second interface also may output information, such as to the reception component.

The processing system of the wireless communication device includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device can be configurable or configured for use in an AP, such as the AP 102 described with reference to FIG. 1. In some other examples, the wireless communication device can be an AP that includes such a processing system and other components including multiple antennas. The wireless communication device is capable of transmitting and receiving wireless communication in the form of, for example, wireless packets. For example, the wireless communication device can be configurable or configured to transmit and receive packets in the form of physical layer PPDUs and MPDUs conforming to one or more of the IEEE 802.11 family of wireless communication protocol standards. In some other examples, the wireless communication device can be configurable or configured to transmit and receive signals and communication conforming to one or more 3GPP specifications including those for 5G NR or 6G. In some examples, the wireless communication device also includes or can be coupled with one or more application processors which may be further coupled with one or more other memories. In some examples, the wireless communication device further includes at least one external network interface coupled with the processing system that enables communication with a core network or backhaul network that enables the wireless communication device to gain access to external networks including the Internet.

The wireless communication device includes a shared TXOP manager 1025, a channel access manager 1030, and a communication parameters manager 1035. Portions of one or more of the shared TXOP manager 1025, the channel access manager 1030, and the communication parameters manager 1035 may be implemented at least in part in hardware or firmware. For example, one or more of the shared TXOP manager 1025, the channel access manager 1030, and the communication parameters manager 1035 may be implemented at least in part by at least a processor or a modem. In some examples, portions of one or more of the shared TXOP manager 1025, the channel access manager 1030, and the communication parameters manager 1035 may be implemented at least in part by a processor and software in the form of processor-executable code stored in memory.

The wireless communication device may support wireless communication performed in accordance with examples as disclosed herein. The shared TXOP manager 1025 is configurable or configured to receive a first message, from a second wireless communication device, that indicates the second wireless communication device has obtained access to a wireless medium for a duration of a transmission opportunity (TXOP). The channel access manager 1030 is configurable or configured to transmit, in association with receiving the first message, one or more medium management messages configured to inhibit one or more other wireless communication devices associated with the first wireless communication device from transmitting during a second duration associated with a second message. that is expected to be transmitted from the second wireless communication device The communication parameters manager 1035 is configurable or configured to receive the second message from the second wireless communication device during the second duration, the second message indicating a set of one or more communication parameters for the first wireless communication device to share a portion of the TXOP for communication with the one or more other wireless communication devices.

In some examples, a first medium management message that includes a channel occupancy indication that corresponds to a duration associated with the first medium management message, where the channel occupancy indication is configured to cause the one or more other wireless communication devices to refrain from transmitting to the first wireless communication device for the duration associated with the first medium management message.

In some examples, the channel access manager 1030 is configurable or configured to receive an uplink transmission from a third wireless communication device of the one or more other wireless communication devices subsequent to the duration associated with the first medium management message indicated by the channel occupancy indication and prior to receiving the second message.

In some examples, a first medium management message that includes a transmission opportunity duration limit for the one or more other wireless communication devices, the transmission opportunity duration limit corresponding to a third duration that is less than the second duration associated with the second message.

In some examples, the channel access manager 1030 is configurable or configured to ignore an uplink transmission from the one or more other wireless communication devices subsequent to the third duration and within a time offset that precedes an expected transmission time of the second message.

In some examples, a first medium management message that includes an indication to the one or more other wireless communication devices to perform a ready-to-send (RTS) and clear-to-send (CTS) exchange prior to uplink data transmissions from the one or more other wireless communication devices to the first wireless communication device.

In some examples, the channel access manager 1030 is configurable or configured to receive an RTS message from a third wireless communication device in accordance with the RTS and CTS exchange. In some examples, the channel access manager 1030 is configurable or configured to transmit a CTS message to the third wireless communication device in accordance with the RTS and CTS exchange when communication associated with the RTS message are expected to be completed prior to an expected transmission time of the second message.

In some examples, to support one or more medium management messages, the channel access manager 1030 is configurable or configured to a first medium management message that include a MU EDCA timer for the one or more other wireless communication devices that indicates a third duration that corresponds to an expected transmission time of the second message, where the MU EDCA timer is configured to inhibit single-user uplink communication to the first wireless communication device for the third duration associated with the MU EDCA timer.

In some examples, to support one or more medium management messages, the channel access manager 1030 is configurable or configured to a first medium management message that include an indication to the one or more other wireless communication devices that uplink communication with the first wireless communication device are to be discontinued at a time offset in advance of an expected transmission time of the second message.

In some examples, a first medium management message that includes a channel occupancy indication that corresponds to a third duration between the first medium management message and an expected transmission time of the second message.

In some examples, the first message includes an indication that the wireless medium will be occupied by the second wireless communication device through an expected transmission time of the second message.

In some examples, the first message includes an expected transmission time of the second message and a timeout value that indicates the first wireless communication device is to discontinue inhibition of the one or more other wireless communication devices associated with the first wireless communication device from transmitting during the second duration associated with the second message from the second wireless communication device if the second message is not received at the first wireless communication device before an end of a third duration indicated by the timeout value.

In some examples, the first message further includes a total duration of the TXOP, that indicates the first wireless communication device is to discontinue inhibition of the one or more other wireless communication devices associated with the first wireless communication device from transmitting subsequent to the total duration of the TXOP.

In some examples, the channel access manager 1030 is configurable or configured to receive, prior to receiving the first message, an indication of whether the one or more other wireless communication devices associated with the first wireless communication device are to be inhibited from transmitting during any portion of the duration of a transmission opportunity (TXOP).

Additionally, or alternatively, the wireless communication device may support wireless communication performed in accordance with examples as disclosed herein. In some examples, the shared TXOP manager 1025 is configurable or configured to obtain access to a wireless medium for communication with one or more other wireless communication devices during a transmission opportunity (TXOP), the TXOP corresponding to a duration during which the first wireless communication device has the access to the wireless medium. In some examples, the channel access manager 1030 is configurable or configured to transmit a first message that indicates an occupancy time interval within the TXOP during which the wireless medium is reserved for communication of the first wireless communication device. In some examples, the communication parameters manager 1035 is configurable or configured to transmit a second message to a second wireless communication device indicating communication parameters for the second wireless communication device to share a portion of the TXOP that is outside of the occupancy time interval for communication with the one or more other wireless communication devices associated with the second wireless communication device. In some examples, the occupancy time interval corresponds to a duration associated with the first message.

In some examples, the channel access manager 1030 is configurable or configured to transmit a third message subsequent to the first message and prior to the second message, the third message indicating an extended occupancy time interval within the TXOP during which the wireless medium is reserved for communication of the first wireless communication device.

In some examples, the occupancy time interval within the TXOP is extended on a per physical layer convergence protocol service data unit (PSDU) basis for one or more PSDU communication of the first wireless communication device prior to transmission of the second message.

In some examples, the occupancy time interval that corresponds to the duration associated with the first message allows for spatial reuse of the wireless medium by the second wireless communication device for communication with a third wireless communication device associated with the second wireless communication device, and where the third wireless communication device is outside of a communication range of the first wireless communication device.

In some examples, the occupancy time interval indicates that the wireless medium will be occupied by the first wireless communication device through an expected transmission time of the second message.

In some examples, the first message includes an expected transmission time of the second message and a timeout value that indicates the second wireless communication device is to discontinue sharing procedures associated with the TXOP if the second message is not received at the second wireless communication device before an end of a third duration indicated by the timeout value.

In some examples, the first message further includes a total duration of the TXOP, that indicates the second wireless communication device is to discontinue sharing procedures associated with the TXOP subsequent to the total duration of the TXOP.

In some examples, the shared TXOP manager 1025 is configurable or configured to transmit, prior to transmitting the first message, an indication of whether the occupancy time interval within the TXOP will span all or a portion of a second duration between the first message and the second message.

Figure 11:
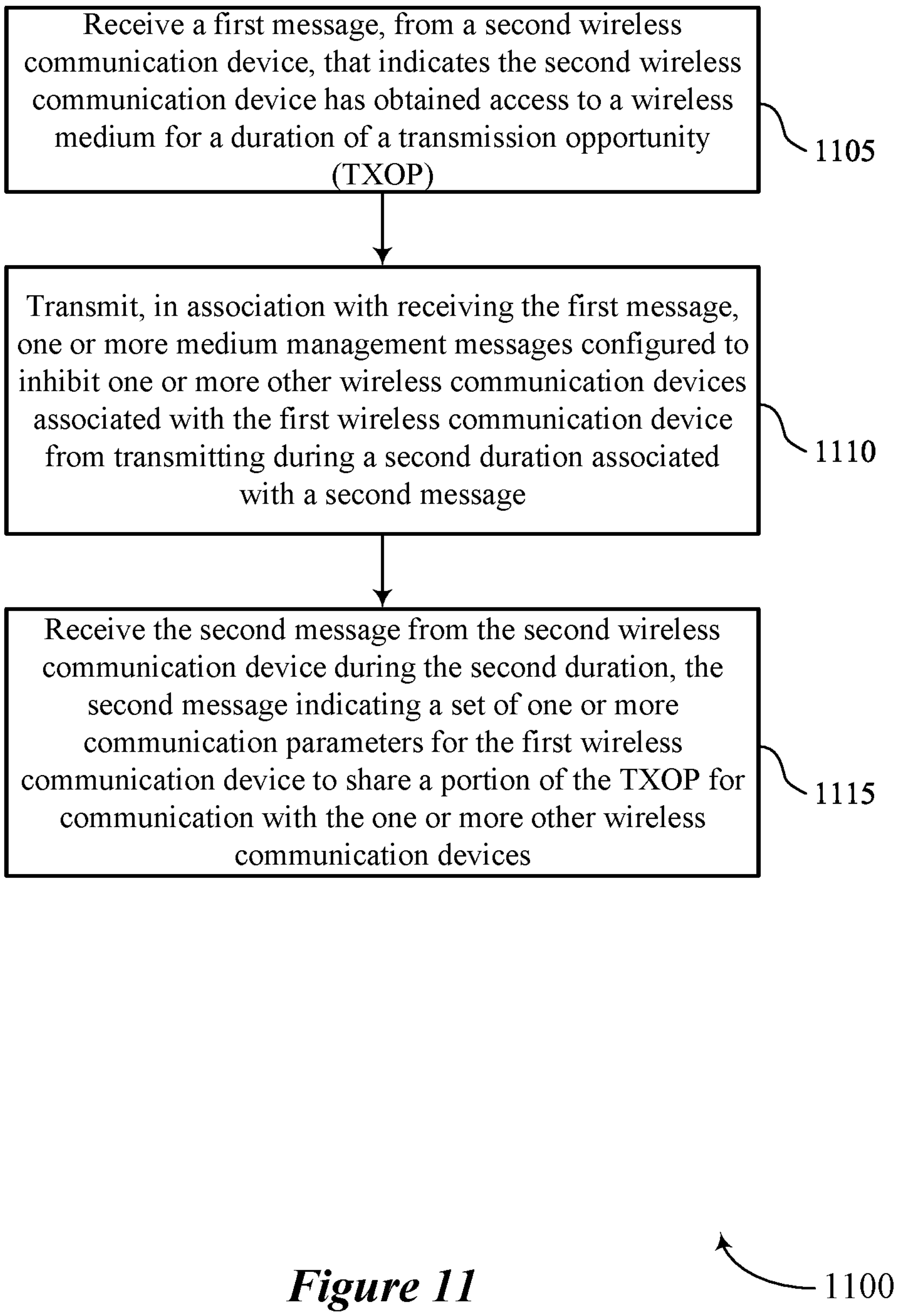
FIGS. 11 and 12 show flowcharts illustrating example processes performable by or at a first wireless communication device that supports medium protection for shared APs in C-TDMA.

FIG. 11 shows a flowchart illustrating an example process 1100 performable by or at a first wireless communication device that supports medium protection for shared access points in C-TDMA. The operations of the process 1100 may be implemented by a first wireless communication device or its components as described herein. For example, the process 1100 may be performed by a wireless communication device, such as the wireless communication device described with reference to FIG. 10, operating as or within a wireless AP. In some examples, the process 1100 may be performed by a wireless AP, such as one of the APs 102 described with reference to FIG. 1.

In some examples, in 1105, the first wireless communication device may receive a first message, from a second wireless communication device, that indicates the second wireless communication device has obtained access to a wireless medium for a duration of a TXOP. The operations of 1105 may be performed in accordance with examples as disclosed herein. In some implementations, aspects of the operations of 1105 may be performed by a shared TXOP manager 1025 as described with reference to FIG. 10.

In some examples, in 1110, the first wireless communication device may transmit, in association with receiving the first message, one or more medium management messages configured to inhibit one or more other wireless communication devices associated with the first wireless communication device from transmitting during a second duration associated with a second message. The operations of 1110 may be performed in accordance with examples as disclosed herein. In some implementations, aspects of the operations of 1110 may be performed by a channel access manager 1030 as described with reference to FIG. 10.

In some examples, in 1115, the first wireless communication device may receive the second message from the second wireless communication device during the second duration, the second message indicating a set of one or more communication parameters for the first wireless communication device to share a portion of the TXOP for communication with the one or more other wireless communication devices. The operations of 1115 may be performed in accordance with examples as disclosed herein. In some implementations, aspects of the operations of 1115 may be performed by a communication parameters manager 1035 as described with reference to FIG. 10.

Figure 12:
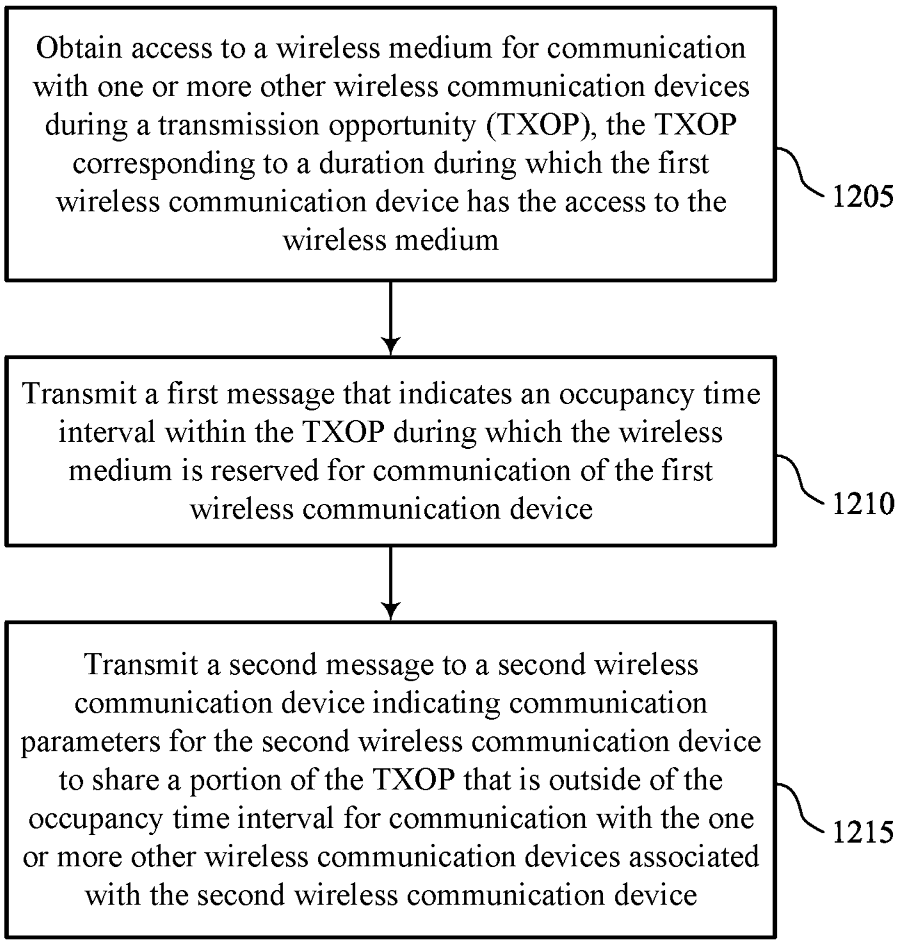

FIG. 12 shows a flowchart illustrating an example process 1200 performable by or at a first wireless communication device that supports medium protection for shared access points in C-TDMA. The operations of the process 1200 may be implemented by a first wireless communication device or its components as described herein. For example, the process 1200 may be performed by a wireless communication device, such as the wireless communication device described with reference to FIG. 10, operating as or within a wireless AP. In some examples, the process 1200 may be performed by a wireless AP, such as one of the APs 102 described with reference to FIG. 1.

In some examples, in 1205, the first wireless communication device may obtain access to a wireless medium for communication with one or more other wireless communication devices during a transmission opportunity (TXOP), the TXOP corresponding to a duration during which the first wireless communication device has the access to the wireless medium. The operations of 1205 may be performed in accordance with examples as disclosed herein. In some implementations, aspects of the operations of 1205 may be performed by a shared TXOP manager 1025 as described with reference to FIG. 10.

In some examples, in 1210, the first wireless communication device may transmit a first message that indicates an occupancy time interval within the TXOP during which the wireless medium is reserved for communication of the first wireless communication device. The operations of 1210 may be performed in accordance with examples as disclosed herein. In some implementations, aspects of the operations of 1210 may be performed by a channel access manager 1030 as described with reference to FIG. 10.

In some examples, in 1215, the first wireless communication device may transmit a second message to a second wireless communication device indicating communication parameters for the second wireless communication device to share a portion of the TXOP that is outside of the occupancy time interval for communication with the one or more other wireless communication devices associated with the second wireless communication device. The operations of 1215 may be performed in accordance with examples as disclosed herein. In some implementations, aspects of the operations of 1215 may be performed by a communication parameters manager 1035 as described with reference to FIG. 10.

Implementation examples are described in the following numbered clauses:

Aspect 1: A method for wireless communication performed by a first wireless communication device, comprising: receiving a first message, from a second wireless communication device, that indicates the second wireless communication device has obtained access to a wireless medium for a duration of a transmission opportunity (TXOP); transmitting, in association with receiving the first message, one or more medium management messages configured to inhibit one or more other wireless communication devices associated with the first wireless communication device from transmitting during a second duration associated with a second message; and receiving the second message from the second wireless communication device during the second duration, the second message indicating a set of one or more communication parameters for the first wireless communication device to share a portion of the TXOP for communication with the one or more other wireless communication devices.

Aspect 2: The method of aspect 1, wherein the one or more medium management messages comprise a first medium management message that includes a channel occupancy indication that corresponds to a duration of the first medium management message, wherein the channel occupancy indication is configured to cause the one or more other wireless communication devices to refrain from transmitting to the first wireless communication device for the duration of the first medium management message.

Aspect 3: The method of aspect 2, further comprising: receiving an uplink transmission from a third wireless communication device of the one or more other wireless communication devices subsequent to the duration of the first medium management message indicated by the channel occupancy indication and prior to receiving the second message.

Aspect 4: The method of any of aspects 1 through 3, wherein the one or more medium management messages comprise a first medium management message that includes a transmission opportunity duration limit for the one or more other wireless communication devices, the transmission opportunity duration limit corresponding to a third duration that is less than the second duration associated with the second message.

Aspect 5: The method of aspect 4, further comprising: ignoring an uplink transmission from the one or more other wireless communication devices subsequent to the third duration and within a time offset that precedes an expected transmission time of the second message.

Aspect 6: The method of any of aspects 1 through 5, wherein the one or more medium management messages comprise a first medium management message that includes an indication to the one or more other wireless communication devices to perform a ready-to-send (RTS) and clear-to-send (CTS) exchange prior to uplink data transmissions from the one or more other wireless communication devices to the first wireless communication device.

Aspect 7: The method of aspect 6, further comprising: receiving an RTS message from a third wireless communication device in accordance with the RTS and CTS exchange; and transmitting a CTS message to the third wireless communication device in accordance with the RTS and CTS exchange when communication associated with the RTS message are expected to be completed prior to an expected transmission time of the second message.

Aspect 8: The method of any of aspects 1 through 7, wherein the one or more medium management messages comprises: a first medium management message that includes a multi-user enhanced distributed channel access (MU EDCA) timer for the one or more other wireless communication devices that indicates a third duration that corresponds to an expected transmission time of the second message, wherein the MU EDCA timer is configured to inhibit single-user uplink communication to the first wireless communication device for the third duration of the MU EDCA timer.

Aspect 9: The method of any of aspects 1 through 8, wherein the one or more medium management messages comprises: a first medium management message that includes an indication to the one or more other wireless communication devices that uplink communication with the first wireless communication device are to be discontinued at a time offset in advance of an expected transmission time of the second message.

Aspect 10: The method of any of aspects 1 through 9, wherein the one or more medium management messages comprise a first medium management message that includes a channel occupancy indication that corresponds to a third duration between the first medium management message and an expected transmission time of the second message.

Aspect 11: The method of any of aspects 1 through 10, wherein the first message includes an indication that the wireless medium will be occupied by the second wireless communication device through an expected transmission time of the second message.

Aspect 12: The method of any of aspects 1 through 11, wherein the first message includes an expected transmission time of the second message and a timeout value that indicates the first wireless communication device is to discontinue inhibition of the one or more other wireless communication devices associated with the first wireless communication device from transmitting during the second duration associated with the second message from the second wireless communication device if the second message is not received at the first wireless communication device before an end of a third duration indicated by the timeout value.

Aspect 13: The method of aspect 12, wherein the first message further includes a total duration of the TXOP, that indicates the first wireless communication device is to discontinue inhibition of the one or more other wireless communication devices associated with the first wireless communication device from transmitting subsequent to the total duration of the TXOP.

Aspect 14: The method of any of aspects 1 through 13, further comprising: receiving, prior to receiving the first message, an indication of whether the one or more other wireless communication devices associated with the first wireless communication device are to be inhibited from transmitting during any portion of the duration of a transmission opportunity (TXOP).

Aspect 15: A method for wireless communication performed by a first wireless communication device, comprising: obtaining access to a wireless medium for communication with one or more other wireless communication devices during a transmission opportunity (TXOP), the TXOP corresponding to a duration during which the first wireless communication device has the access to the wireless medium; transmitting a first message that indicates an occupancy time interval within the TXOP during which the wireless medium is reserved for communication of the first wireless communication device; and transmitting a second message to a second wireless communication device indicating communication parameters for the second wireless communication device to share a portion of the TXOP that is outside of the occupancy time interval for communication with the one or more other wireless communication devices associated with the second wireless communication device.

Aspect 16: The method of aspect 15, wherein the occupancy time interval corresponds to a duration of the first message.

Aspect 17: The method of aspect 16, further comprising: transmitting a third message subsequent to the first message and prior to the second message, the third message indicating an extended occupancy time interval within the TXOP during which the wireless medium is reserved for communication of the first wireless communication device.

Aspect 18: The method of aspect 17, wherein the occupancy time interval within the TXOP is extended on a per physical layer convergence protocol service data unit (PSDU) basis for one or more PSDU communication of the first wireless communication device prior to transmission of the second message.

Aspect 19: The method of any of aspects 16 through 18, wherein the occupancy time interval that corresponds to the duration of the first message allows for spatial reuse of the wireless medium by the second wireless communication device for communication with a third wireless communication device associated with the second wireless communication device, and wherein the third wireless communication device is outside of a communication range of the first wireless communication device.

Aspect 20: The method of any of aspects 15 through 19, wherein the occupancy time interval indicates that the wireless medium will be occupied by the first wireless communication device through an expected transmission time of the second message.

Aspect 21: The method of any of aspects 15 through 20, wherein the first message includes an expected transmission time of the second message and a timeout value that indicates the second wireless communication device is to discontinue sharing procedures associated with the TXOP if the second message is not received at the second wireless communication device before an end of a third duration indicated by the timeout value.

Aspect 22: The method of aspect 21, wherein the first message further includes a total duration of the TXOP, that indicates the second wireless communication device is to discontinue sharing procedures associated with the TXOP subsequent to the total duration of the TXOP.

Aspect 23: The method of any of aspects 15 through 22, further comprising: transmitting, prior to transmitting the first message, an indication of whether the occupancy time interval within the TXOP will span all or a portion of a second duration between the first message and the second message.

Aspect 24: A first wireless communication device for wireless communication performed, comprising one or more memories storing processor-executable code, and one or more processors coupled with the one or more memories and individually or collectively operable to execute the code to cause the first wireless communication device to perform a method of any of aspects 1 through 14.

Aspect 25: A first wireless communication device for wireless communication performed, comprising at least one means for performing a method of any of aspects 1 through 14.

Aspect 26: A non-transitory computer-readable medium storing code for wireless communication performed, the code comprising instructions executable by one or more processors to perform a method of any of aspects 1 through 14.

Aspect 27: A first wireless communication device for wireless communication performed, comprising one or more memories storing processor-executable code, and one or more processors coupled with the one or more memories and individually or collectively operable to execute the code to cause the first wireless communication device to perform a method of any of aspects 15 through 23.

Aspect 28: A first wireless communication device for wireless communication performed, comprising at least one means for performing a method of any of aspects 15 through 23.

Aspect 29: A non-transitory computer-readable medium storing code for wireless communication performed, the code comprising instructions executable by one or more processors to perform a method of any of aspects 15 through 23.

As used herein, the term “determine” or “determining” encompasses a wide variety of actions and, therefore, “determining” can include calculating, computing, processing, deriving, estimating, investigating, looking up (such as via looking up in a table, a database, or another data structure), inferring, ascertaining, or measuring, among other possibilities. Also, “determining” can include receiving (such as receiving information), accessing (such as accessing data stored in memory) or transmitting (such as transmitting information), among other possibilities. Additionally, “determining” can include resolving, selecting, obtaining, choosing, establishing and other such similar actions.

As used herein, a phrase referring to “at least one of” or “one or more of” a list of items refers to any combination of those items, including single members. As an example, “at least one of: a, b, or c” is intended to cover: a, b, c, a-b, a-c, b-c, and a-b-c. As used herein, “or” is intended to be interpreted in the inclusive sense, unless otherwise explicitly indicated. For example, “a or b” may include a only, b only, or a combination of a and b. Furthermore, as used herein, a phrase referring to “a” or “an” element refers to one or more of such elements acting individually or collectively to perform the recited function(s). Additionally, a “set” refers to one or more items, and a “subset” refers to less than a whole set, but non-empty.

As used herein, “based on” is intended to be interpreted in the inclusive sense, unless otherwise explicitly indicated. For example, “based on” may be used interchangeably with “based at least in part on,” “associated with,” “in association with,” or “in accordance with” unless otherwise explicitly indicated. Specifically, unless a phrase refers to “based on only ‘a,’” or the equivalent in context, whatever it is that is “based on ‘a,’” or “based at least in part on ‘a,’” may be based on “a” alone or based on a combination of “a” and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless communication device, comprising:

a processing system that includes processor circuitry and memory circuitry that stores code for the processor circuitry, the processing system configured to cause the first wireless communication device to:

receive a first message, from a second wireless communication device, indicating that the second wireless communication device has obtained a transmission opportunity (TXOP);

transmit, in association with receiving the first message, one or more medium management messages configured to inhibit one or more other wireless communication devices associated with the first wireless communication device from transmitting during a second duration associated with a second message, the one or more medium management messages including a first medium management message that includes a TXOP duration limit for the one or more other wireless communication devices, the TXOP duration limit being a third duration that is less than the second duration associated with the second message; and receive the second message from the second wireless communication device during the second duration, the second message indicating a set of one or more communication parameters for the first wireless communication device to share a portion of the TXOP for communication with the one or more other wireless communication devices.

2. The first wireless communication device of claim 1, wherein a first medium management message of the one or more medium management messages includes a channel occupancy indication that corresponds to a duration associated with the first medium management message, wherein the channel occupancy indication is configured to cause the one or more other wireless communication devices to refrain from transmitting to the first wireless communication device for the duration associated with the first medium management message.

3. The first wireless communication device of claim 2, wherein the processing system is further configured to cause the first wireless communication device to:

receive an uplink transmission from a third wireless communication device of the one or more other wireless communication devices subsequent to the duration associated with the first medium management message indicated by the channel occupancy indication and prior to receiving the second message.

4. The first wireless communication device of claim 1, wherein the processing system is further configured to cause the first wireless communication device to: ignore an uplink transmission from the one or more other wireless communication devices subsequent to the third duration and within a time offset that precedes an expected transmission time of the second message.

5. The first wireless communication device of claim 1, wherein a first medium management message of the one or more medium management messages includes an indication to the one or more other wireless communication devices to perform a ready-to-send (RTS) and clear-to-send (CTS) exchange prior to performing uplink data transmissions to the first wireless communication device.

6. The first wireless communication device of claim 5, wherein the processing system is further configured to cause the first wireless communication device to:

receive an RTS message from a third wireless communication device of the one or more other wireless communication devices in accordance with an RTS and CTS exchange; and transmit a CTS message to the third wireless communication device in accordance with the RTS and CTS exchange in accordance with one or more data transmissions associated with the RTS message being expected to be completed prior to an expected transmission time of the second message.

7. The first wireless communication device of claim 1, wherein a first medium management message of the one or more medium management messages includes a channel occupancy indication that corresponds to a third duration between the first medium management message and an expected transmission time of the second message.

8. The first wireless communication device of claim 1, wherein the first message includes an indication that the wireless medium will be occupied by the second wireless communication device through an expected transmission time of the second message.

9. The first wireless communication device of claim 1, wherein the processing system is further configured to cause the first wireless communication device to:

receive, prior to receiving the first message, an indication of whether the one or more other wireless communication devices associated with the first wireless communication device are to be inhibited from transmitting during any portion of the duration of a TXOP.

10. A first wireless communication device, comprising:

a processing system that includes processor circuitry and memory circuitry that stores code for the processor circuitry, the processing system configured to cause the first wireless communication device to:

receive a first message, from a second wireless communication device, indicating that the second wireless communication device has obtained a transmission opportunity (TXOP);

transmit, in association with receiving the first message, one or more medium management messages configured to inhibit one or more other wireless communication devices associated with the first wireless communication device from transmitting during a second duration associated with a second message, the one or more medium management messages including a first medium management message that includes a multi-user enhanced distributed channel access (MU EDCA) timer for the one or more other wireless communication devices that indicates a third duration that corresponds to an expected transmission time of the second message, wherein the MU EDCA timer is configured to inhibit single-user uplink transmissions to the first wireless communication device for the third duration associated with the MU EDCA timer; and receive the second message from the second wireless communication device during the second duration, the second message indicating a set of one or more communication parameters for the first wireless communication device to share a portion of the TXOP for communication with the one or more other wireless communication devices.

11. A first wireless communication device, comprising:

a processing system that includes processor circuitry and memory circuitry that stores code for the processor circuitry, the processing system configured to cause the first wireless communication device to:

receive a first message, from a second wireless communication device, indicating that the second wireless communication device has obtained a transmission opportunity (TXOP);

transmit, in association with receiving the first message, one or more medium management messages configured to inhibit one or more other wireless communication devices associated with the first wireless communication device from transmitting during a second duration associated with a second message, the one or more medium management messages including a first medium management message that includes an indication to the one or more other wireless communication devices that uplink transmissions to the first wireless communication device are to be discontinued at a time offset in advance of an expected transmission time of the second message; and receive the second message from the second wireless communication device during the second duration, the second message indicating a set of one or more communication parameters for the first wireless communication device to share a portion of the TXOP for communication with the one or more other wireless communication devices.

12. A first wireless communication device, comprising:

a processing system that includes processor circuitry and memory circuitry that stores code for the processor circuitry, the processing system configured to cause the first wireless communication device to:

receive a first message, from a second wireless communication device, indicating that the second wireless communication device has obtained a transmission opportunity (TXOP), the first message including an expected transmission time of a second message and a timeout value that indicates to the first wireless communication device to discontinue inhibition of one or more other wireless communication devices associated with the first wireless communication device from transmitting during a second duration associated with the second message from a second wireless communication device in accordance with the second message not being received at the first wireless communication device before an end of a third duration indicated by the timeout value;

transmit, in association with receiving the first message, one or more medium management messages configured to inhibit the one or more other wireless communication devices associated with the first wireless communication device from transmitting during the second duration associated with the second message; and receive the second message from the second wireless communication device during the second duration, the second message indicating a set of one or more communication parameters for the first wireless communication device to share a portion of the TXOP for communication with the one or more other wireless communication devices.

13. The first wireless communication device of claim 12, wherein the first message further indicates a total duration of the TXOP, and indicates to the first wireless communication device to discontinue inhibition of the one or more other wireless communication devices associated with the first wireless communication device from transmitting subsequent to the total duration of the TXOP.

14. A first wireless communication device, comprising:

a processing system that includes processor circuitry and memory circuitry that stores code for the processor circuitry, the processing system configured to cause the first wireless communication device to:

obtain a transmission opportunity (TXOP);

transmit a first message that indicates an occupancy time interval within the TXOP during which the wireless medium is reserved for communication of the first wireless communication device;

transmit a second message subsequent to the first message indicating an extended occupancy time interval within the TXOP during which the wireless medium is reserved for communication of the first wireless communication device; and transmit a third message subsequent to the second message to a second wireless communication device indicating communication parameters for the second wireless communication device to share a portion of the TXOP that is outside of the occupancy time interval for communication with the one or more other wireless communication devices associated with the second wireless communication device.

15. The first wireless communication device of claim 14, wherein:

the occupancy time interval corresponds to a duration associated with the first message.

16. The first wireless communication device of claim 14, wherein the processing system is further configured to cause the first wireless communication device to: ignore an uplink transmission from the one or more other wireless communication devices subsequent to the third duration and within a time offset that precedes an expected transmission time of the second message.

17. The first wireless communication device of claim 14, wherein the occupancy time interval indicates that the wireless medium will be occupied by the first wireless communication device through an expected transmission time of the second message.

18. A first wireless communication device, comprising:

a processing system that includes processor circuitry and memory circuitry that stores code for the processor circuitry, the processing system configured to cause the first wireless communication device to:

obtain a transmission opportunity (TXOP);

transmit a first message that indicates an occupancy time interval within the TXOP during which the wireless medium is reserved for communication of the first wireless communication device, the first message including an expected transmission time of the second message and a timeout value that indicates the second wireless communication device is to discontinue sharing procedures associated with the TXOP in accordance with the second message not being received at the second wireless communication device before an end of a third duration indicated by the timeout value; and transmit a second message to a second wireless communication device indicating communication parameters for the second wireless communication device to share a portion of the TXOP that is outside of the occupancy time interval for communication with the one or more other wireless communication devices associated with the second wireless communication device.

19. A first wireless communication device, comprising:

a processing system that includes processor circuitry and memory circuitry that stores code for the processor circuitry, the processing system configured to cause the first wireless communication device to:

obtain a transmission opportunity (TXOP);

transmit a first message that indicates an occupancy time interval within the TXOP during which the wireless medium is reserved for communication of the first wireless communication device;

transmit a second message to a second wireless communication device indicating communication parameters for the second wireless communication device to share a portion of the TXOP that is outside of the occupancy time interval for communication with the one or more other wireless communication devices associated with the second wireless communication device; and transmit, prior to transmitting the first message, an indication of whether the occupancy time interval within the TXOP will span all or a portion of a second duration between the first message and the second message.

* * * * *